United States Patent
Ma et al.

(10) Patent No.: US 9,041,751 B2
(45) Date of Patent: May 26, 2015

(54) ELECTROMECHANICAL SYSTEMS DISPLAY DEVICE INCLUDING A MOVABLE ABSORBER AND A MOVABLE REFLECTOR ASSEMBLY

(71) Applicant: QUALCOMM MEMS Technologies, Inc., San Diego, CA (US)

(72) Inventors: Jian J. Ma, Carlsbad, CA (US); John Hyunchul Hong, San Clemente, CA (US)

(73) Assignee: QUALCOMM MEMS Technologies, Inc., San Diego, CA (US)

(*) Notice: Subject to any disclaimer, the term of this patent is extended or adjusted under 35 U.S.C. 154(b) by 268 days.

(21) Appl. No.: 13/666,412

(22) Filed: Nov. 1, 2012

(65) Prior Publication Data

US 2014/0118428 A1 May 1, 2014

(51) Int. Cl.
*G09G 5/02* (2006.01)
*F21V 7/04* (2006.01)
*G02B 26/08* (2006.01)

(52) U.S. Cl.
CPC .. *G09G 5/02* (2013.01); *F21V 7/04* (2013.01); *G02B 26/0841* (2013.01)

(58) Field of Classification Search
CPC ................ G06F 3/042–3/045; G06F 3/0488; G06F 3/04883
USPC .................................................. 345/156–178
See application file for complete search history.

(56) References Cited

U.S. PATENT DOCUMENTS

| | | | |
|---|---|---|---|
| 6,704,513 B1 | 3/2004 | Goossen | |
| 6,833,957 B2 | 12/2004 | Sato | |
| 7,957,049 B1 | 6/2011 | Parry-Jones | |
| 2002/0015215 A1 | 2/2002 | Miles | |
| 2002/0167730 A1 | 11/2002 | Needham et al. | |
| 2005/0046919 A1 | 3/2005 | Taguchi et al. | |

(Continued)

FOREIGN PATENT DOCUMENTS

WO    WO9814804 A1    4/1998

OTHER PUBLICATIONS

International Search Report and Written Opinion—PCT/US2013/066607—ISA/EPO—Feb. 27, 2014.

(Continued)

*Primary Examiner* — Kent Chang
*Assistant Examiner* — Nathan Brittingham
(74) *Attorney, Agent, or Firm* — Weaver Austin Villeneuve & Sampson

(57) ABSTRACT

This disclosure provides systems, methods, and apparatus for an analog or multistate electromechanical systems display devices including movable absorber together with a movable reflective layers. In one aspect, an electromechanical systems display device may include a movable reflector assembly and a movable absorber assembly. The absorber assembly may be disposed between the reflector assembly and a substrate. The absorber assembly may be configured to move to an absorber white state position proximate the reflector assembly and defining a first gap when the reflector assembly is in a reflector white/black position. The absorber assembly may be configured to move to a closed position closer to the substrate, defining a second gap, when the reflector assembly is in the reflector white/black position. The reflector assembly may be configured to move from the reflector white/black position to increase a height of the second gap when the absorber assembly is in the closed position.

32 Claims, 18 Drawing Sheets

(56) References Cited

U.S. PATENT DOCUMENTS

| | | | |
|---|---|---|---|
| 2006/0066938 A1* | 3/2006 | Chui | 359/291 |
| 2008/0055706 A1 | 3/2008 | Chui et al. | |
| 2010/0315696 A1 | 12/2010 | Lee et al. | |
| 2011/0170167 A1 | 7/2011 | Miles | |

OTHER PUBLICATIONS

Partial International Search Report—PCT/US2013/066607—ISA/EPO—Jan. 8, 2014.

* cited by examiner

Common Voltages

| | | $VC_{ADD\_H}$ | $VC_{HOLD\_H}$ | $VC_{REL}$ | $VC_{HOLD\_L}$ | $VC_{ADD\_L}$ |
|---|---|---|---|---|---|---|
| Segment Voltages | $VS_H$ | Stable | Stable | Relax | Stable | Actuate |
| | $VS_L$ | Actuate | Stable | Relax | Stable | Stable |

ELECTROMECHANICAL SYSTEMS DISPLAY DEVICE INCLUDING A MOVABLE ABSORBER AND A MOVABLE REFLECTOR ASSEMBLY

TECHNICAL FIELD

This disclosure relates generally to electromechanical systems (EMS) display devices and more particularly to EMS display devices including movable reflector assemblies.

DESCRIPTION OF THE RELATED TECHNOLOGY

Electromechanical systems (EMS) include devices having electrical and mechanical elements, actuators, transducers, sensors, optical components (such as mirrors and optical film layers) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

An EMS display device can reflect a white light, a colored light, and reflect substantially no light. When the EMS display device reflects substantially no light, the device generates a black. The white light that an EMS display device reflects may depend in part on the absorption of different wavelengths of light by an absorbing metal layer in the EMS display device. For example, some EMS display devices may reflect a white that is green-tinted due to higher absorption by the absorbing metal layer in the blue and red spectrums. Such higher absorption in the blue and red spectrums also may reduce the brightness of the white.

SUMMARY

The systems, methods and devices of the disclosure each have several innovative aspects, no single one of which is solely responsible for the desirable attributes disclosed herein.

One innovative aspect of the subject matter described in this disclosure can be implemented in a device that includes a substrate, a reflector assembly and an absorber assembly disposed between the reflector assembly and the substrate. The absorber assembly may be configured to move to an absorber white state position proximate the reflector assembly, defining a first gap between the absorber assembly and the substrate, when the reflector assembly is in a reflector white/black position. The absorber assembly may be further configured to move to a closed position closer to the substrate than the absorber white state position, defining a second gap between the reflector assembly and the absorber assembly, when the reflector assembly is in the reflector white/black position. The reflector assembly may be configured to move from the reflector white/black position to increase a height of the second gap when the absorber assembly is in the closed position.

The device may include a base dielectric layer disposed on the substrate. The absorber assembly may be proximate the base dielectric layer when the absorber assembly is in the closed position.

When the absorber assembly is in the absorber white state position defining the first gap, the device may be configured to reflect a white color. When the reflector assembly is in the reflector white/black position and when the absorber assembly is in the closed position defining the second gap, the device may be configured to reflect substantially no light.

When the reflector assembly is moved from the reflector white/black position to increase the height of the second gap while the absorber assembly is in the closed position, the device may be configured to reflect a colored light (other than black or white). In some implementations, when the reflector assembly is in the reflector white/black position, the reflector assembly is in a relaxed state.

The absorber assembly may include a metal layer. The absorber assembly may include a first dielectric layer having a first refractive index disposed on a surface of the metal layer facing the base dielectric layer. The base dielectric layer may include a second dielectric layer having a second refractive index disposed on a surface of the base dielectric layer facing the absorber assembly. The first refractive index may be smaller than the second refractive index. The absorber assembly may include a passivation layer disposed on a surface of the metal layer facing the reflector assembly.

The reflector assembly may include a reflective metal layer, a first dielectric layer having a first refractive index disposed on a surface of the reflective metal layer facing the absorber assembly. The reflector assembly may include a second dielectric layer having a second refractive index disposed on the first dielectric layer. The first refractive index may be smaller than the second refractive index.

The device also may include a top electrode layer disposed on a dielectric layer. The top electrode layer and the reflector assembly may define a third gap. When the reflector assembly moves from the reflector white/black position to increase the height of the second gap, a height of the third gap may decrease. In some implementations, when the reflector assembly is in the reflector white/black position, the first gap may have a height in the range of about 90 nanometers to 140 nanometers and the second gap may have a height in the range of about 90 nanometers to 140 nanometers.

In some implementations, an apparatus may have a display that includes the device. The apparatus may include a processor that is configured to communicate with the display. The processor may be configured to process image data. The apparatus may include a memory device that is configured to communicate with the processor.

The apparatus also may include a top electrode layer disposed on a dielectric layer. The top electrode layer and the reflector assembly may define a third gap. The apparatus may include a base electrode layer formed on the substrate and a driver circuit. The driver circuit may be configured to control the display by applying a first voltage difference between the top electrode layer and the reflector assembly and by applying a second voltage difference between the base electrode layer and the absorber assembly. The apparatus may include a controller configured to send at least a portion of the image data to the driver circuit.

The apparatus may include an image source module configured to send the image data to the processor. The image source module may include a receiver, a transceiver, and/or a transmitter. The apparatus may include an input device configured to receive input data and to communicate the input data to the processor.

The apparatus also may include a transparent base electrode layer formed on the substrate. In some implementations, the base dielectric layer may be formed on the base electrode layer.

Another innovative aspect of the subject matter described in this disclosure can be implemented in a device that includes a base dielectric layer, an absorber assembly, a reflector assembly, a top electrode layer and a base electrode layer. The absorber assembly may be disposed between the reflector assembly and the base dielectric layer. The absorber assembly may be configured to move to an absorber white state position proximate the reflector assembly, defining a first gap, when the reflector assembly is in a reflector white/black position. The absorber assembly may be configured to move to a closed position proximate the reflector assembly, defining a second gap, when the reflector assembly is in the reflector white/black position.

The reflector assembly may be disposed between the absorber assembly and the top electrode layer. The reflector assembly and the top electrode layer may define a third gap when the reflector assembly is in the reflector white/black position. When the absorber assembly is in the closed position, the reflector assembly may be configured to move to a reflector color position between the reflector white/black position and the top electrode layer.

When the absorber assembly is in the absorber white state and the reflector assembly is in the reflector white/black position, the device may be configured to reflect a white color. When the absorber assembly is in the closed position and the reflector assembly is in the reflector white/black position, the device may be configured to reflect a dark color or a substantially black color.

When the reflector assembly is in the reflector color position and the absorber is in the closed position, the device may be configured to reflect a nonwhite, nonblack color. In some implementations, when the reflector assembly is in the reflector white/black position, the reflector assembly may be in a relaxed state.

The absorber assembly may include a metal layer. The base electrode layer may include an ITO layer. The top electrode assembly may include a metal layer.

Another innovative aspect of the subject matter described in this disclosure can be implemented in a device that includes a substrate, an absorber assembly, a reflector assembly, a top electrode layer and a base electrode layer. The absorber assembly may be disposed between the reflector assembly and the substrate. The absorber assembly may be configured to move to an absorber white state position proximate the reflector assembly, defining a first gap having a first height. The absorber assembly may be configured to move to a closed position closer to the substrate, defining a second gap having a second height between the absorber assembly and the reflector assembly.

The reflector assembly may be disposed between the absorber assembly and the top electrode layer. The reflector assembly and the top electrode layer may define a third gap having a third height. When the absorber assembly is in the closed position, the reflector assembly may be configured to move to increase the second height of the second gap and to decrease the third height of the third gap.

The device may include a base dielectric layer disposed on the substrate. The closed position of the absorber assembly may be proximate the reflector assembly.

The first height may be in the range of about 80 nanometers to 140 nanometers. The second height may be in the range of about 80 nanometers to 140 nanometers.

When the absorber assembly is in the absorber white state defining the first gap having the first height, the device may be configured to reflect a white color. When the absorber assembly is in the closed position defining the second gap having the second height while the reflector assembly is in the reflector white/black position, the device may be configured to reflect a dark color or a substantially black color.

When the reflector assembly is moved to increase the second height of the second gap and to decrease the third height of the third gap while the absorber assembly is at the closed position, the device may be configured to reflect a non-black, non-white colored light.

The absorber assembly may include a metal layer. The base electrode layer may include an ITO layer. The top electrode assembly may include a metal layer.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
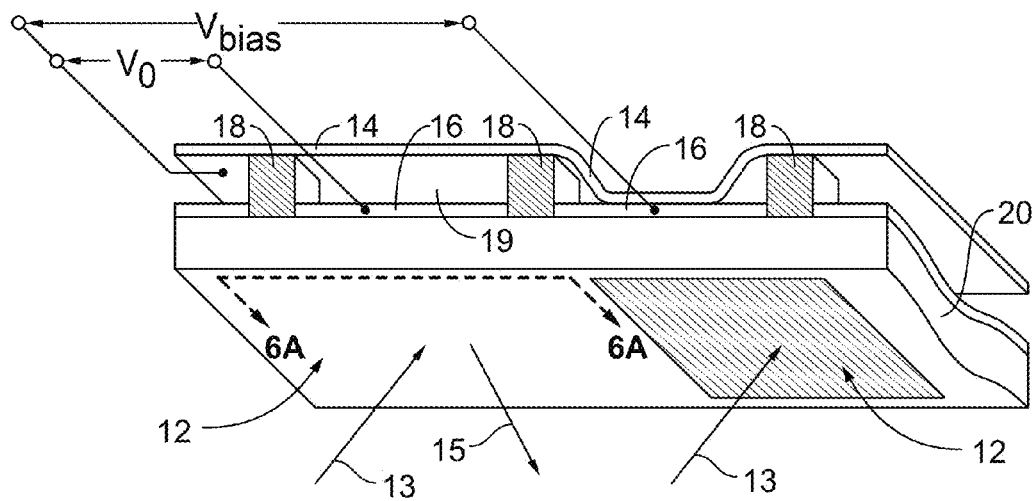
FIG. 1 shows an example of an isometric view depicting two adjacent pixels in a series of pixels of an interferometric modulator (IMOD) display device.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device or system that can be configured to display an image, whether in motion (for example, video) or stationary (for example, still image), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (i.e., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS), microelectromechanical systems (MEMS) and non-MEMS applications), aesthetic structures (for example, display of images on a piece of jewelry) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Some implementations described herein relate to EMS display devices and methods of their fabrication. In some implementations, an EMS display device may include a movable reflector assembly. For example, in some implementations, an EMS display device may include a substrate, a reflector assembly, and an absorber assembly. The absorber assembly may be disposed between the reflector assembly and the substrate. The absorber assembly may be configured to move to an absorber white state position proximate the reflector assembly and defining a first gap between the absorber assembly and the substrate when the reflector assembly is in a reflector white/black position. In this state, the EMS device may reflect a white light. The absorber assembly also may be configured to move to a closed position closer to the substrate and defining a second gap between the absorber assembly and the reflector assembly when the reflector assembly is in the reflector white/black position. In this state, the EMS device may reflect substantially no light. In some implementations, the substrate may have a base dielectric layer formed thereon. In such implementations, the closed position of the absorber assembly may be proximate the base dielectric layer. The reflector assembly may be configured to move from the reflector white/black position to increase a height of the second gap when the absorber assembly is in the closed position. In this state, the EMS display device may reflect a colored light.

Particular implementations of the subject matter described in this disclosure can be implemented to realize one or more of the following potential advantages. In some implementations, an EMS display device having a movable absorber assembly together with a movable reflector assembly may be able to generate a white, a black, and a color in the visible spectrum. The EMS display device may have a white-to-black contrast ratio of about 92 to 1. The white light reflected by the EMS display device may be close to the CIE (International Commission on Illumination) Standard Illuminant D65 on a CIE 1931 color space chromaticity diagram. Further, the brightness of the white light reflected by such an EMS display device may be greater (for example, about 12% greater luminosity) than other EMS display devices.

An example of a suitable EMS or MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant gap defined between the absorber and the reflector. The reflector can be moved to two or more different positions, which can change the size of the optical resonant gap and thereby affect the reflectance of the interferometric modulator. The reflectance spectrums of IMODs can create fairly broad spectral bands which can be shifted across the visible wavelengths to generate different colors. The position of the spectral band can be adjusted by changing the height of the optical resonant gap. One way of changing the optical resonant gap is by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, for example, to a user.

Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In an absorber white state position, i.e., a relaxed position the movable reflective layer can be positioned at a relatively large distance from the fixed partially reflective layer. In a closed position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, absorbing and/or destructively interfering light within the visible range. In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows 13 indicating light incident upon the pixels 12, and light 15 reflecting from the pixel 12 on the left. Although not illustrated in detail, it will be understood by a person having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, such as chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and electrical conductor, while different, electrically more conductive layers or portions (for example, of the optical stack 16 or of other structures of the IMOD) can serve to bus signals between IMOD pixels. The optical stack 16 also can include one or more insulating or dielectric layers covering one or more conductive layers or an electrically conductive/optically absorptive layer.

In some implementations, the layer(s) of the optical stack 16 can be patterned into parallel strips, and may form row electrodes in a display device as described further below. As will be understood by one having ordinary skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be less than <10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the pixel 12 on the left in FIG. 1, with the gap 19 between the movable reflective layer 14 and optical stack 16. However, when a potential difference, a voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
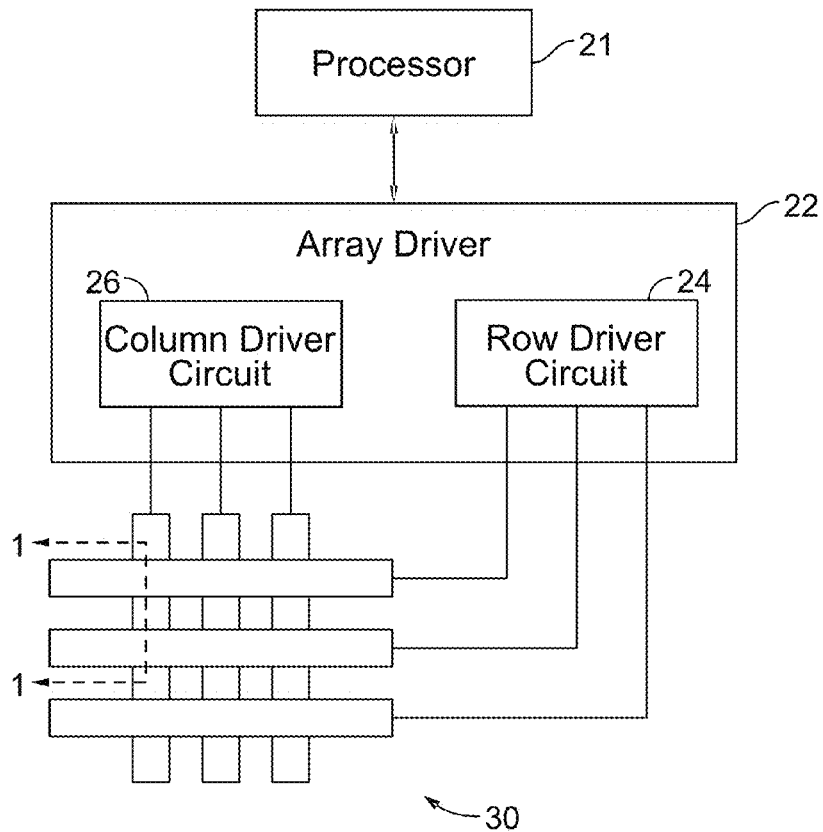
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, for example, a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
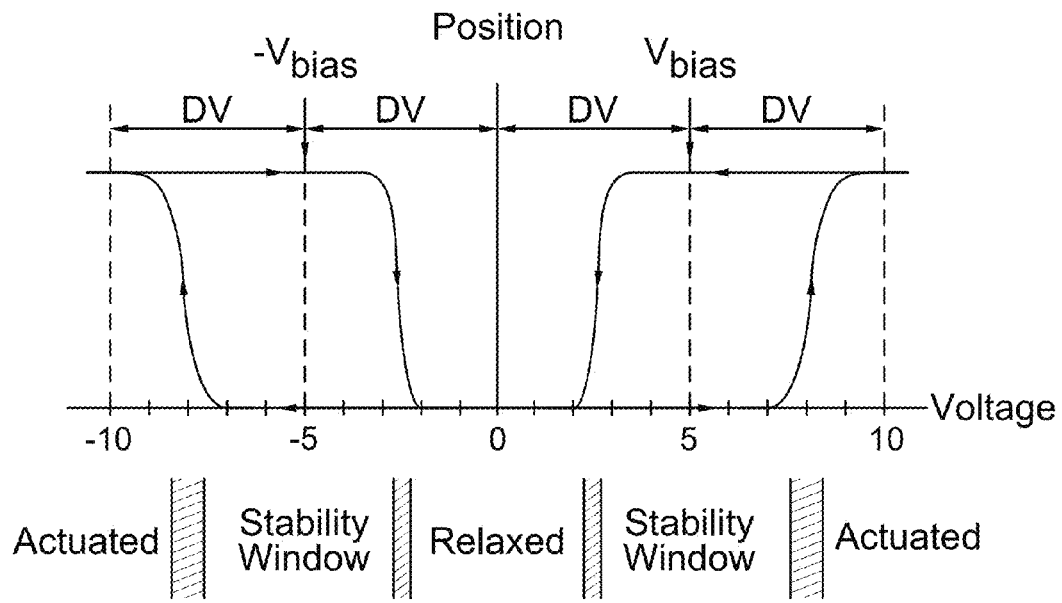
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3 shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3. An interferometric modulator may use, in one example implementation, about a 10-volt potential difference to cause the movable reflective layer, or mirror, to change from the relaxed state to the actuated state. When the voltage is reduced from that value, the movable reflective layer maintains its state as the voltage drops back below, in this example, 10 volts, however, the movable reflective layer does not relax completely until the voltage drops below 2 volts. Thus, a range of voltage, approximately 3 to 7 volts, in this example, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about, in this example, 10 volts, and pixels that are to be relaxed are exposed to a voltage difference of near zero volts. After addressing, the pixels can be exposed to a steady state or bias voltage difference of approximately 5 volts in this example, such that they remain in the previous strobing state. In this example, after being addressed, each pixel sees a potential difference within the "stability window" of about 3-7 volts. This hysteresis property feature enables the pixel design, such as that illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an interferometric modulator when various common and segment voltages are applied. As will be understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator pixels (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which produce the same polarity potential difference across the modulators. In some other implementations, signals can be used which alternate the polarity of the potential difference of the modulators from time to time. Alternation of the polarity across the modulators (that is, alternation of the polarity of write procedures) may reduce or inhibit charge accumulation which could occur after repeated write operations of a single polarity.

Figure 5A:
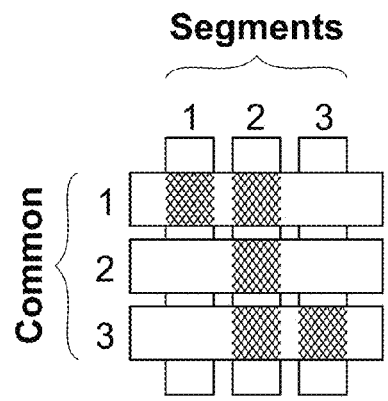
FIG. 5A shows an example of a diagram illustrating a frame of display data in the 3×3 interferometric modulator display of FIG. 2.
Figure 5B:
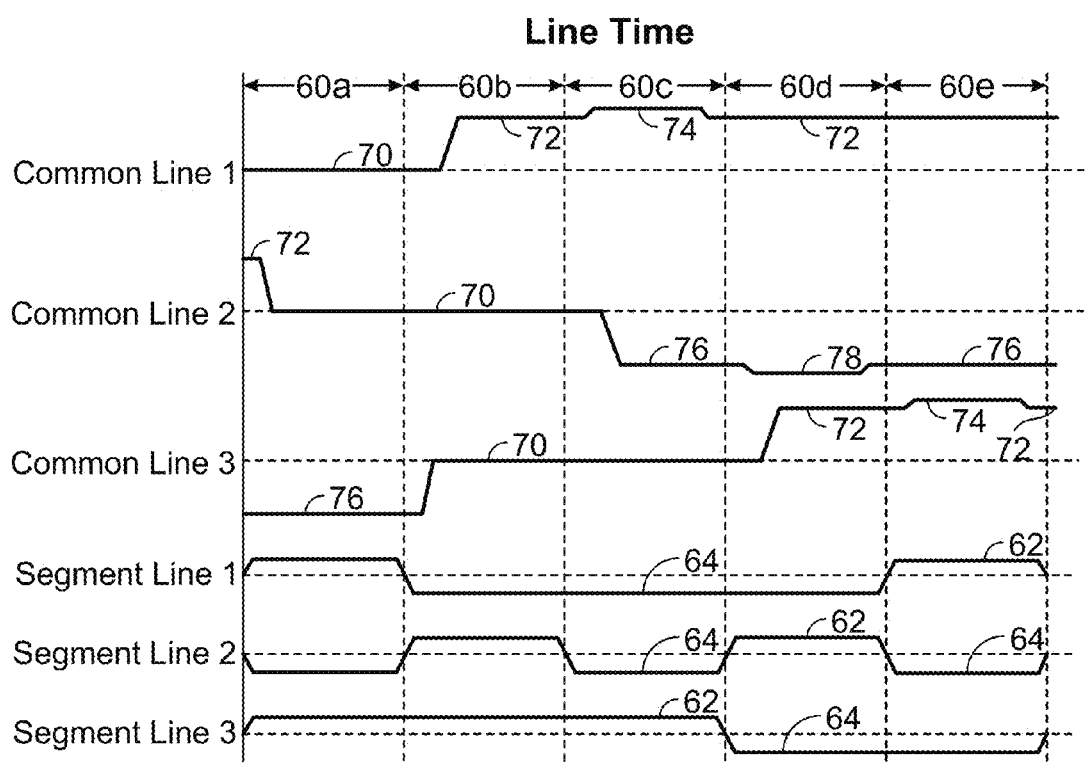
FIG. 5B shows an example of a timing diagram for common and segment signals that may be used to write the frame of display data illustrated in FIG. 5A.

FIG. 5A shows an example of a diagram illustrating a frame of display data in the 3×3 interferometric modulator display of FIG. 2. FIG. 5B shows an example of a timing diagram for common and segment signals that may be used to write the frame of display data illustrated in FIG. 5A. The signals can be applied to a 3×3 array, similar to the array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, for example, a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$-relax and $VC_{HOLD\_L}$-stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
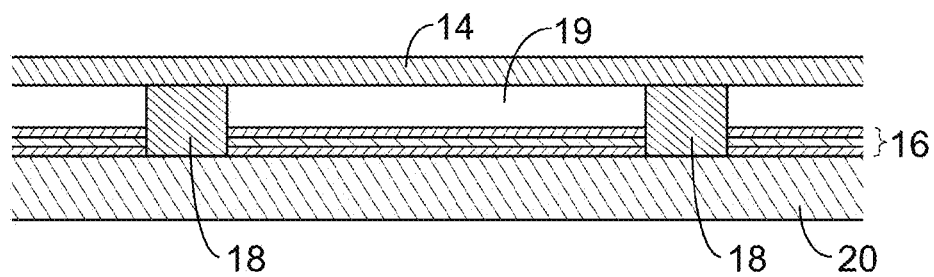
FIG. 6A shows an example of a partial cross-section of the interferometric modulator display of FIG. 1.
Figure 6B:
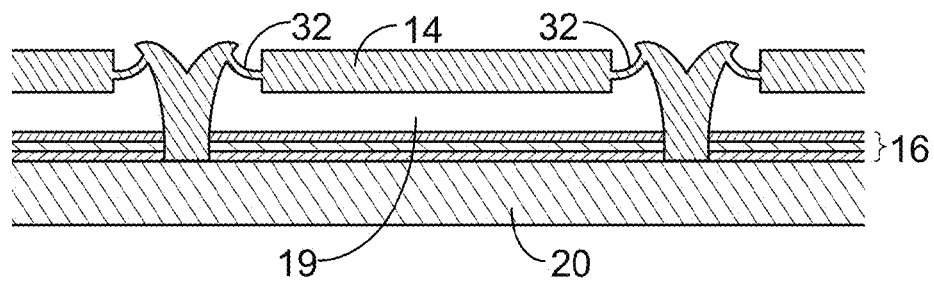
FIGS. 6B-6E show examples of cross-sections of varying implementations of interferometric modulators.
Figure 6C:
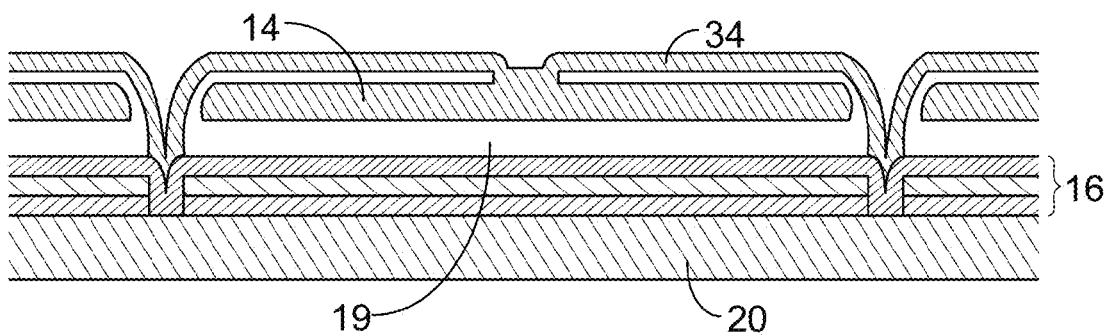

The details of the structure of interferometric modulators that operate in accordance with the principles set forth above may vary widely. For example, FIGS. 6A-6E show examples of cross-sections of varying implementations of interferometric modulators, including the movable reflective layer 14 and its supporting structures. FIG. 6A shows an example of a partial cross-section of the interferometric modulator display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
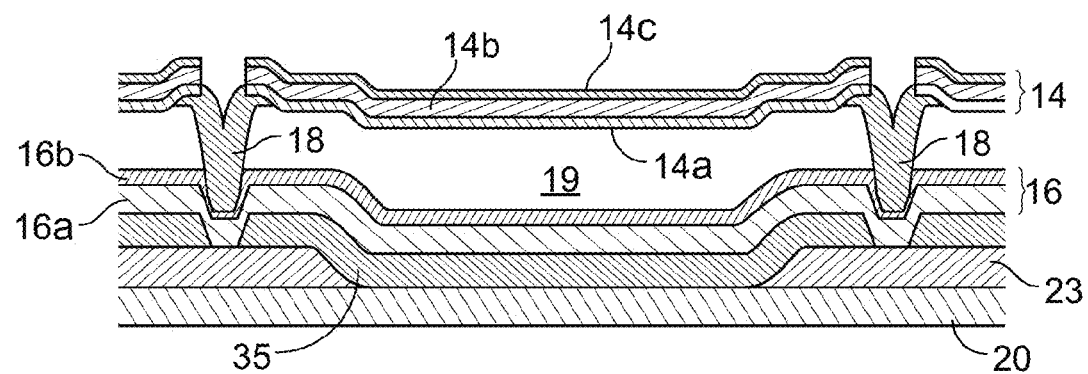

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide (SiO$_2$). In some implementations, the support layer 14b can be a stack of layers, such as, for example, a SiO$_2$/SiON/SiO$_2$ tri-layer stack. Either or both of the reflective sub-layer 14a and the conductive layer 14c can include, for example, an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (such as between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoromethane (CF$_4$) and/or oxygen (O$_2$) for the MoCr and SiO$_2$ layers and chlorine (Cl$_2$) and/or boron trichloride (BCl$_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
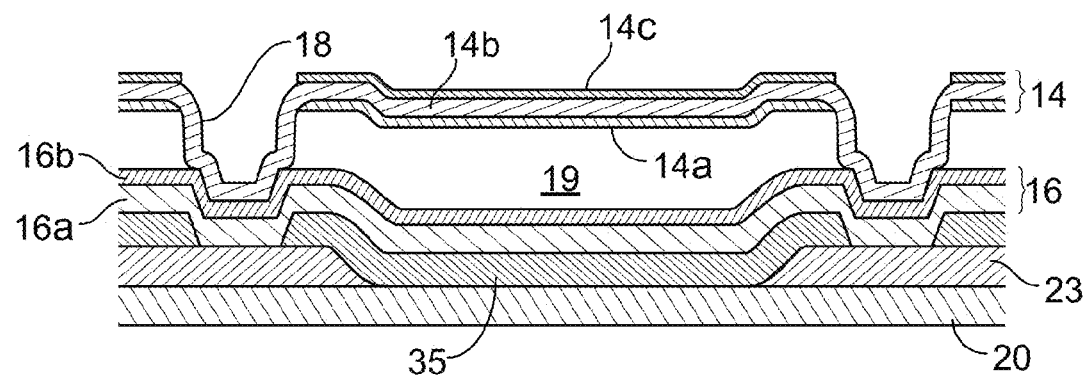

FIG. 6E shows another example of an IMOD, where the movable reflective layer 14 is self-supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer. In some implementations, the optical absorber 16a is an order of magnitude (ten times or more) thinner than the movable reflective layer 14. In some implementations, optical absorber 16a is thinner than reflective sub-layer 14a.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as, for example, patterning.

Figure 7:
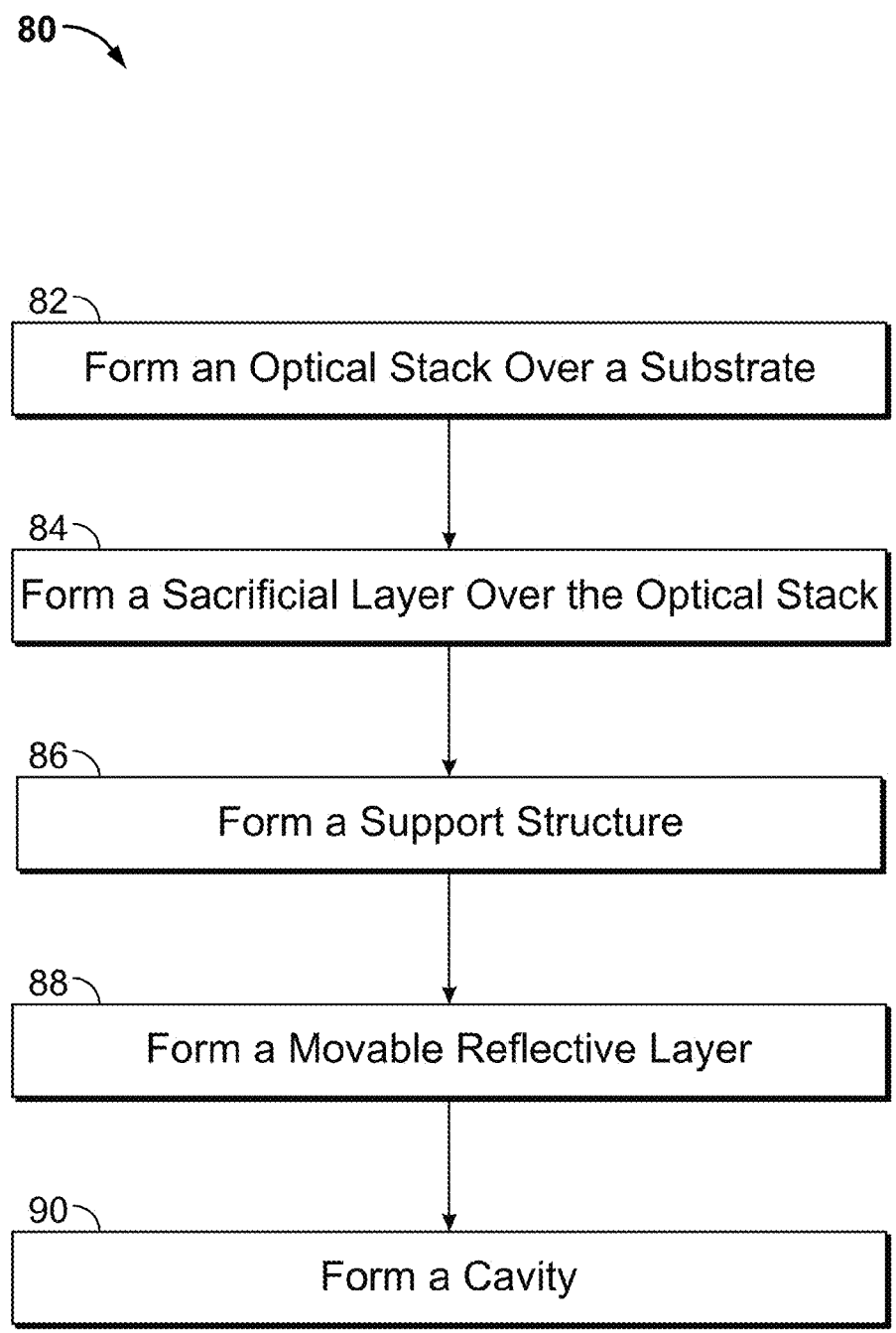
FIG. 7 shows an example of a flow diagram illustrating a manufacturing process for an interferometric modulator.

FIG. 7 shows an example of a flow diagram illustrating a manufacturing process 80 for an interferometric modulator, and FIGS. 8A-8E show examples of cross-sectional schematic illustrations of corresponding stages of such a manufacturing process 80. In some implementations, the manufacturing process 80 can be implemented to manufacture an electromechanical systems device such as interferometric modulators of the general type illustrated in FIGS. 1 and 6.

Figure 8A:
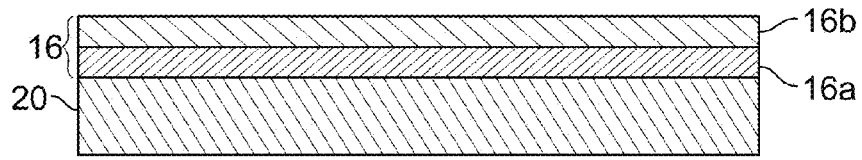
FIGS. 8A-8E show examples of cross-sectional schematic illustrations of various stages in a method of making an interferometric modulator.

The manufacture of an electromechanical systems device can also include other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, such as cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and electrically conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (for example, one or more reflective and/or conductive layers). In addition, the optical stack 16 can be patterned into individual and parallel strips that form the rows of the display. It is noted that FIGS. 8A-8E may not be drawn to scale. For example, in some implementations, one of the sub-layers of the optical stack, the optically absorptive layer, may be very thin, although sub-layers 16a, 16b are shown somewhat thick in FIGS. 8A-8E.

Figure 8B:
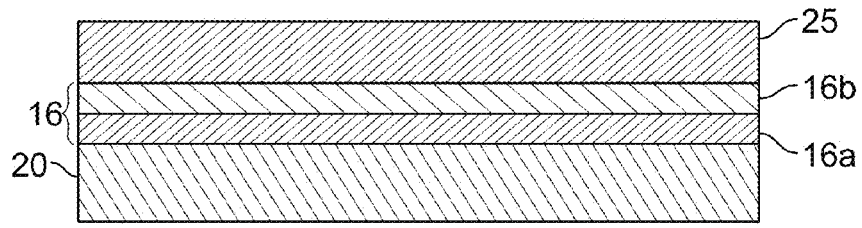

The process 80 continues at block 84 with the formation of a sacrificial layer 25 over the optical stack 16. The sacrificial layer 25 is later removed (see block 90) to form the gap 19 and thus the sacrificial layer 25 is not shown in the resulting interferometric modulators 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (a-Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, which includes many different techniques, such as sputtering), plasma-enhanced chemical vapor deposition (PECVD), thermal chemical vapor deposition (thermal CVD), or spin-coating.

Figure 8C:
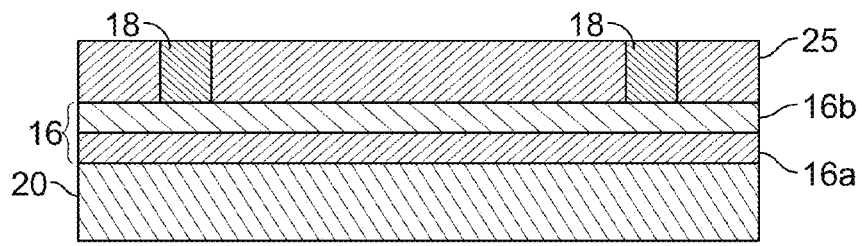

The process 80 continues at block 86 with the formation of a support structure such as post 18, illustrated in FIGS. 1, 6 and 8C. The formation of the post 18 may include patterning the sacrificial layer 25 to form a support structure aperture, then depositing a material (such as a polymer or an inorganic material such as silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
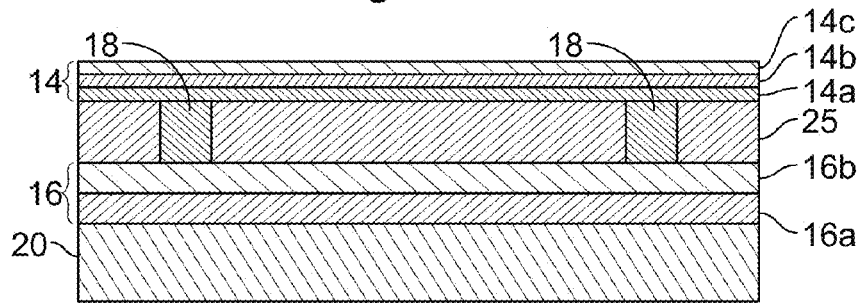
Figure 8E:
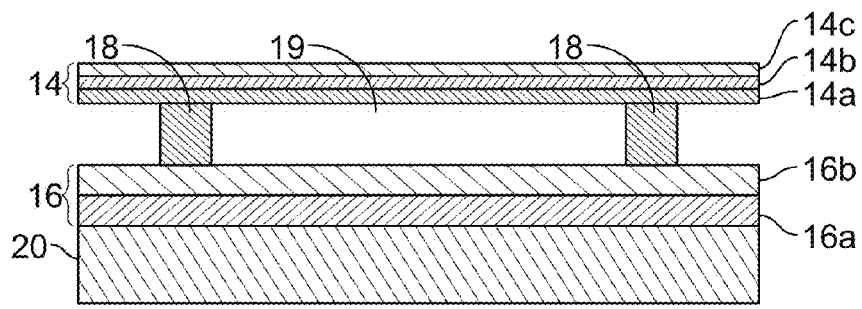

The process 80 continues at block 88 with the formation of a movable reflective layer or membrane such as the movable reflective layer 14 illustrated in FIGS. 1, 6 and 8D. The movable reflective layer 14 may be formed by employing one or more deposition steps including, for example, reflective layer (such as aluminum, aluminum alloy, or other reflective layer) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 also may be referred to herein as an "unreleased" IMOD. As described above in connection with FIG. 1, the movable reflective layer 14 can be patterned into individual and parallel strips that form the columns of the display.

The process 80 continues at block 90 with the formation of a gap, such as gap 19 illustrated in FIGS. 1, 6 and 8E. The gap 19 may be formed by exposing the sacrificial material 25 (deposited at block 84) to an etchant. For example, an etchable sacrificial material such as Mo or a-Si may be removed by dry chemical etching, by exposing the sacrificial layer 25 to a gaseous or vaporous etchant, such as vapors derived from solid $XeF_2$, for a period of time that is effective to remove the desired amount of material. The sacrificial material is typically selectively removed relative to the structures surrounding the gap 19. Other etching methods, such as wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

FIGS. 8F-8J show examples of how an analog or multistate IMOD may be configured to produce different colors. In an analog or multistate IMOD, a pixel's reflective color may be varied by changing the gap spacing between an absorber stack and a mirror stack. In FIGS. 8F-8J, the analog or multistate IMOD 800 includes the mirror stack 805 and the absorber stack 810. In this implementation, the mirror stack 805 includes at least one metallic reflective layer and is shown at five positions relative to the absorber stack 810. However, an analog or multistate IMOD 800 may be movable between substantially more than 5 positions relative to the mirror stack 805. In some such implementations, the size of the gap 830 between the mirror stack 805 and the absorber stack 810 may be varied in a substantially continuous manner. In some such analog or multistate IMODs 800, the size of the gap 830 may be controlled with a high level of precision, e.g., with an error of 10 nm or less. Although the absorber stack 810 includes a single absorber layer in this example, alternative implementations of the absorber stack 810 may include multiple absorber layers.

An incident wave having a wavelength λ will interfere with its own reflection from the mirror stack 805 to create a standing wave with local peaks and nulls. The first null is λ/2 from the mirror and subsequent nulls are located at λ/2 intervals. For that wavelength, a thin absorber layer placed at one of the null positions will absorb very little energy.

Figure 8F:
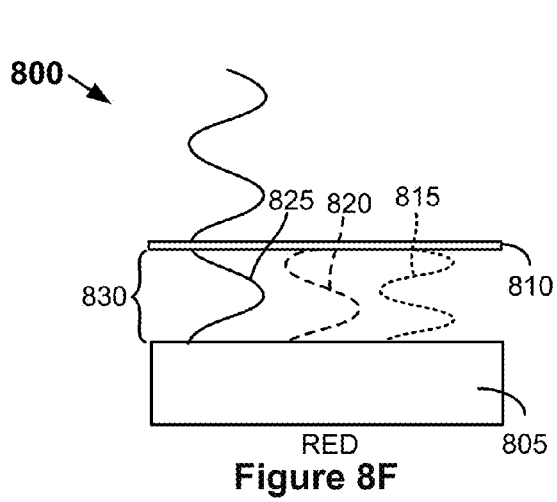
FIGS. 8F-8J show examples of analog or multistate IMODs in a variety of configurations.

Referring first to FIG. 8F, when the gap 830 is substantially equal to the half wavelength of a red color 825, the absorber stack 810 is positioned at the null of the red standing wave interference pattern. The absorption to the red wavelength is near zero because there is almost no red light at the absorber. At this configuration, constructive interference appears between red light reflected from the absorber stack 810 and red light reflected from the mirror stack 805. Therefore, light having a wavelength substantially corresponding to the red color 825 is reflected efficiently. Light of other colors, including the blue color 815 and the green color 820, has a high intensity field at the absorber and is not reinforced by constructive interference. Instead, such light is substantially absorbed by the absorber stack 810.

Figure 8G:
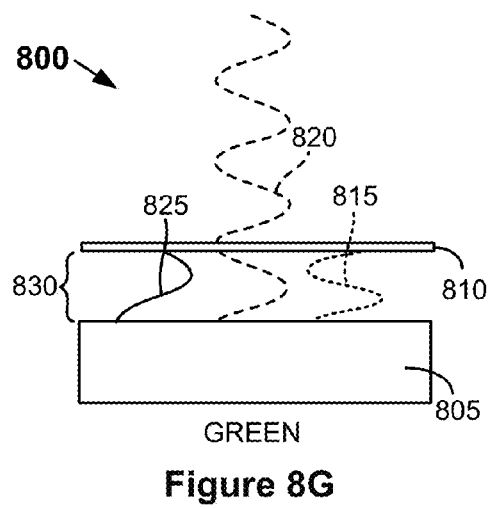

FIG. 8G depicts the analog or multistate IMOD 800 in a configuration wherein the mirror stack 805 is moved closer to the absorber stack 810 (or vice versa). In this example, the gap 830 is substantially equal to the half wavelength of the green color 820. The absorber stack 810 is positioned at the null of the green standing wave interference pattern. The absorption to the green wavelength is near zero because there is almost no green light at the absorber. At this configuration, constructive interference appears between green light reflected from the absorber stack 810 and green light reflected from the mirror stack 805. Light having a wavelength substantially corresponding to the green color 820 is reflected efficiently. Light of other colors, including the red color 825 and the blue color 815, is substantially absorbed by the absorber stack 810.

Figure 8H:
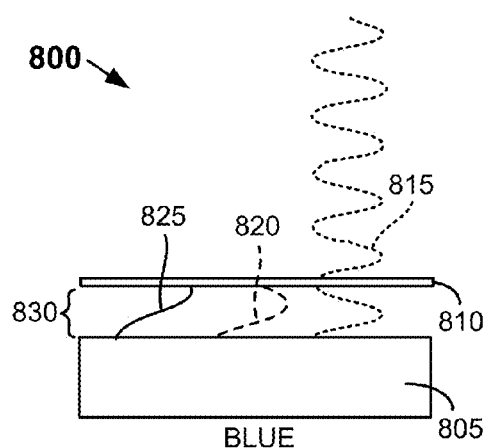

In FIG. 8H, the mirror stack 805 is moved closer to the absorber stack 810 (or vice versa), so that the gap 830 is substantially equal to the half wavelength of the blue color 815. Light having a wavelength substantially corresponding to the blue color 815 is reflected efficiently. Light of other colors, including the red color 825 and the green color 820, is substantially absorbed by the absorber stack 810.

Figure 8I:
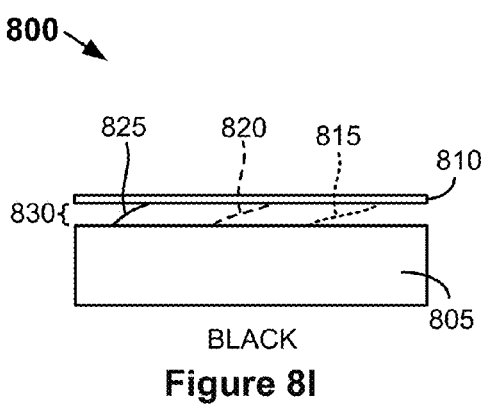

In FIG. 8I, however, the analog or multistate IMOD 800 is in a configuration wherein the gap 830 is substantially equal to ¼ of the wavelength of the average color in the visible range. In such arrangement, the absorber is located near the intensity peak of the interference standing wave; the strong absorption due to high field intensity together with destructive interference between the absorber stack 810 and the mirror stack 805 causes relatively little visible light to be reflected from the analog or multistate IMOD 800. This configuration may be referred to herein as a "black state." In some such implementations, the gap 830 may be made larger or smaller than shown in FIG. 8I, in order to reinforce other wavelengths that are outside the visible range. Accordingly, the configuration of the analog or multistate IMOD 800 shown in FIG. 8I provides merely one example of a black state configuration of the analog or multistate IMOD 800.

Figure 8J:
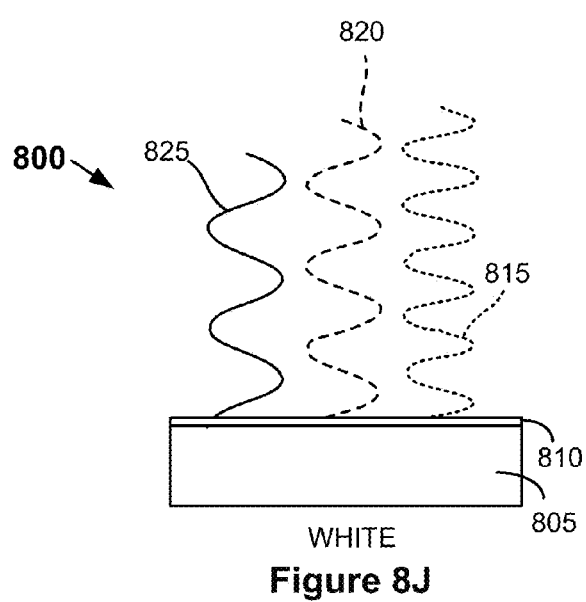

FIG. 8J depicts the analog or multistate IMOD 800 in a configuration wherein the absorber stack 810 is substantially adjacent to the mirror stack 805. In this example, the gap 830 is negligible. Light having a broad range of wavelengths is reflected efficiently from the mirror stack 805 without being absorbed to a significant degree by the absorber stack 810. This configuration may be referred to herein as a "white state." However, absorbing metal layer and the reflective metal layer must be significantly separated to reducing stiction caused by charging via strong electric field between the two metal layers. Dielectric layers with a total thickness of about λ/2 are disposed on the surface of the metal layers. As such, the white state is when the absorber is placed at the first null of the standing wave away from the reflective metal layer in the mirror stack.

A bright and pure white color may be important in electronic book or mobile device applications. In an analog or multistate EMS display device, the reflected color may be determined by the spacing (i.e., a gap height) between a metal absorber layer and a reflective layer, and the spacing can be continuously adjusted to obtained a color of the desired hue angle. A white color in an analog EMS display is reflected when the absorber layer is located at the minimum field intensity of the light standing wave interference pattern. The minimum field intensity (i.e., the standing wave) of different wavelengths of light, however, does not spatially overlap due to the nature of light propagation in normal materials. For example, the null of a longer wavelength is further away from the reflective layer than that of a shorter wavelength. In some analog or multistate EMS display devices, to reflect a white light, the absorber layer is positioned near the minimum intensity of green light. With the absorber layer positioned like this, however, the field intensity of red light and blue light are high at the absorber layer. This may result in greater absorption of red and blue wavelengths of light, generating a green-tinted white color. This greater absorption of red and blue wavelengths also may reduce the brightness of the white light.

An analog or multistate EMS display device, in some implementations, may include an additional air gap or cavity behind the absorber layer. An additional gap associated with the absorber layer in an analog or multistate EMS display device may reduce the slopes of the field intensities of red light and blue light, and as a result, the magnitudes of the field intensities of red light and blue light at the absorber layer may be reduced. Consequently, the absorption of red light and blue light may be reduced and a much improved white color may be generated.

Figures 9A, 9B:
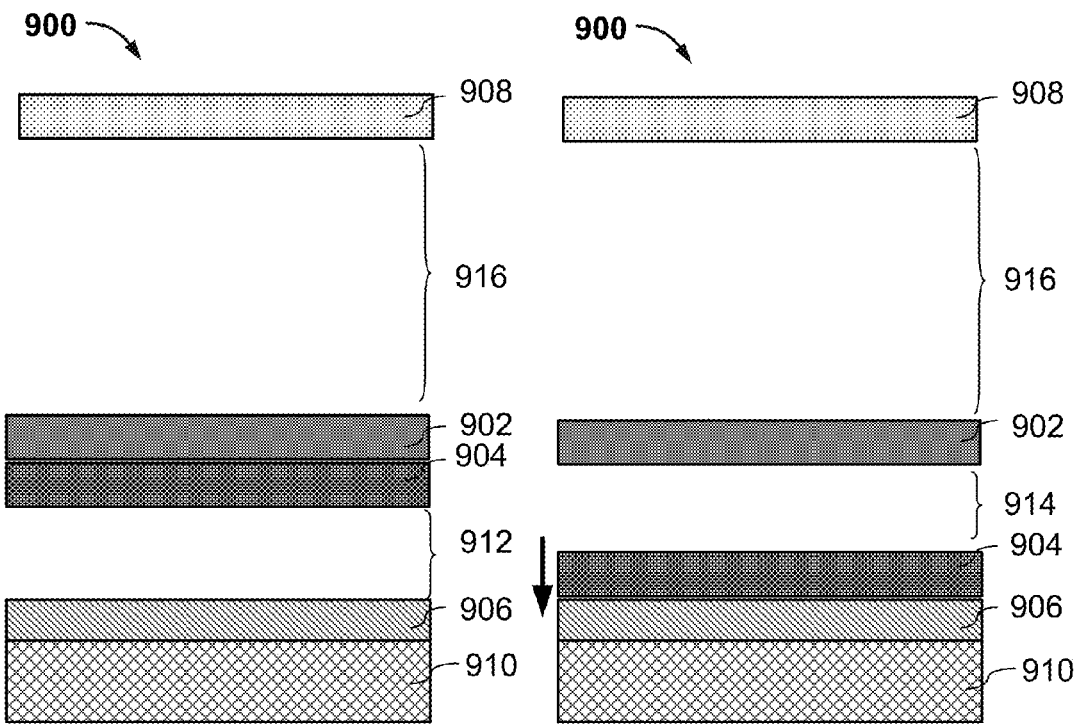
FIGS. 9A-9C and 10A-10C show examples of cross-sectional schematic illustrations of portions of analog or multistate EMS display devices including a movable reflector assembly and a moveable absorber assembly.
Figure 9C:
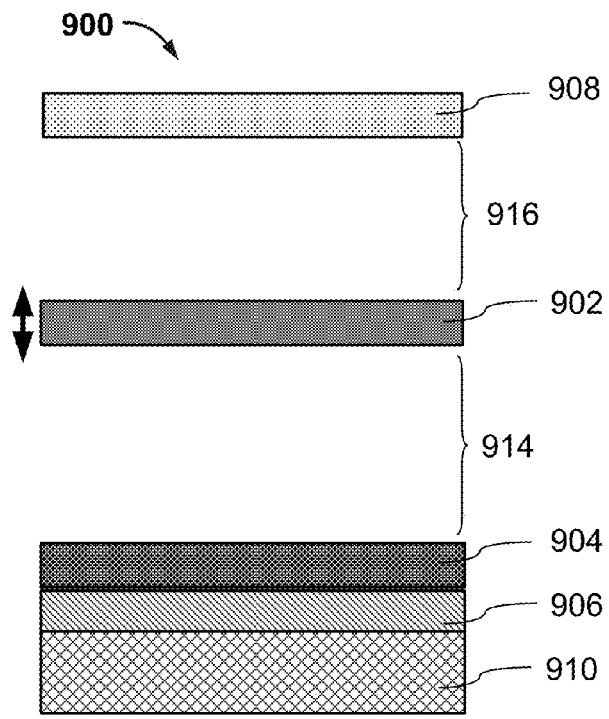

FIGS. 9A-9C and 10A-10C show examples of cross-sectional schematic illustrations of portions of analog or multistate EMS display devices including a movable reflector assembly and a movable absorber assembly. Turning first to FIGS. 9A-9C, an analog or multistate EMS display device 900 includes a reflector assembly 902 and an absorber assembly 904. In some implementations, the reflector assembly 902 and the absorber assembly 904 both may include two or more layers of different materials. In some implementations, the absorber assembly 904 may include a metal absorbing layer. The reflector assembly 902 may include a metal reflecting layer. The analog or multistate EMS display device 900 further includes a base dielectric layer 906 and a top electrode 908. The top electrode 908 may be disposed on a dielectric layer. The base dielectric layer 906 may be disposed on a substrate 910. The substrate 910 may be a transparent substrate such as glass (for example, a display glass or a borosilicate glass) or plastic, and it may be flexible or relatively stiff and unbending. The reflector assembly 902, the absorber assembly 904, and the top electrode 908 may be mechanically connected, directly or indirectly, to the substrate 910 around the perimeters of the reflector assembly 902, the absorber assembly 904, and the top dielectric layer 908 by support posts (not shown).

As shown in FIGS. 9A-9C, the absorber assembly 904 is positioned between the base dielectric layer 906 and the reflector assembly 902. The reflector assembly 902 is positioned between the absorber assembly 904 and the top electrode layer 908.

FIG. 9A shows the analog or multistate EMS display device 900 in a white state; i.e., a user would see a white color through the base dielectric layer 906 and the substrate 910. In the white state, the analog or multistate EMS display device 900 is configured to reflect light across substantially the entire visible spectrum (i.e., the reflected color appears white). In this example, the absorber assembly 904 and the base dielectric layer 906 define a first gap 912 between the absorber assembly 904 and the substrate 910. In some implementations, the first gap 912 may be about 90 nanometers (nm) to 140 nm high, about 115 nm high, or about 120 nm high. In the white state, the reflector assembly 902 and the top electrode 908 define a third gap 916. In the white state, the absorber assembly 904 is in an absorber white state position proximate the reflector assembly 902, and the reflector assembly 902 is in a reflector white/black position.

In some implementations, when the analog or multistate EMS display device 900 is in the white state, substantially the entire area of a surface of the absorber assembly 904 may be in contact with the reflector assembly 902. In some other implementations, to minimize stiction, when the EMS display device 900 is in the white state, the absorber assembly 904 is in a position close to the reflector assembly 902 and there may be a gap of about 5 nm to 15 nm or about 10 nm between the absorber assembly 904 and the reflector assembly 902. For example, in some implementations, either the absorber assembly 904 or the reflector assembly 902 may include small protrusions protruding about 5 nm to 15 nm or about 10 nm from its surface. These small protrusions may aid in forming a gap between the absorber assembly 904 and the reflector assembly 902; for example, the protrusions may set the dimensions of the gap.

FIG. 9B shows the analog or multistate EMS display device 900 in a black state; i.e., a user would see a black color or see substantially no light reflected through the base dielectric layer 906. In the black state, the absorber assembly 904 and the reflector assembly 902 define a second gap 914. In the black state, the reflector assembly 902 and the top electrode 908 define a third gap 916. In some implementations, the second gap 914 may have a height of about 90 nm to 140 nm, about 115 nm, or about 120 nm. In the black state, the absorber assembly 904 is in a closed position closer to the substrate 910 (proximate the base dielectric layer 906 in this example), and the reflector assembly 902 is in the reflector white/black position.

In some implementations, when the analog or multistate EMS display device 900 is in the black state, substantially the entire area of a surface of the absorber assembly 904 may be in contact with the base dielectric layer 906. In some other implementations, to minimize stiction, when the analog or multistate EMS display device 900 is in the black state, the absorber assembly 904 is in a position close to the base dielectric layer 906 and there may be a gap of about 5 nm to 15 nm or about 10 nm between the absorber assembly 904 and the base dielectric layer 906. For example, in some implementations, either the absorber assembly 904 or the base dielectric layer 906 may include small protrusions protruding about 5 nm to 15 nm or about 10 nm from its surface. These small protrusions may aid in forming a gap between the absorber assembly 904 and the base dielectric layer 906; for example, the protrusions may set the dimensions of the gap.

FIG. 9C shows the analog or multistate EMS display device 900 in a colored state; i.e., a user would see a color through the base dielectric layer 906. In the colored state, the absorber assembly 904 and the reflector assembly 902 define a second gap 914. In the colored state, the reflector assembly 902 and the top electrode 908 define a third gap 916. In the colored state, the absorber assembly 904 is in the closed position closer to the substrate 910 (and proximate the base dielectric layer 906 in this example), similar to the black state. In the colored state, however, the reflector assembly 902 moves from the reflector white/black position to a reflector color position, increasing the height of the second gap 914 and decreasing the height of the third gap 916. The height of the second gap may continuously change or may changes in a multistate fashion, from about 90 nm to about 650 nm, to produce all of the visible color spectrum, from black (with the second gap about 90 nm) to magenta (with the second gap about 650 nm). In some implementations, movement of the reflector assembly 902 may increase the height of the second gap 914 from about 90 nm to 140 nm to about 560 nm to 720 nm, and heights therebetween. For example, in some implementations, in the colored state, the second gap may have a height of about 140 nm to 650 nm. In some other implementations, movement of the reflector assembly may decrease the height of the third gap to substantially zero; i.e., the movement of the reflector assembly 902 may collapse the third gap.

The color produced by the analog or multistate EMS display device 900 in the colored state may depend on the position of the reflector assembly 902 and the height(s) of the second gap 914. For example, in some implementations, the reflector assembly 902 may be moved to a continuum of positions to produce a broad array of colors. In some implementations, the reflector assembly 902 may be moved from the reflector white/black position to about 3 or more, 6 or more, 14 or more, 30 or more, or 62 or more different reflector color positions, producing about 5, 8, 16, 32, or 64 different colors (including black and white).

Figure 10A:
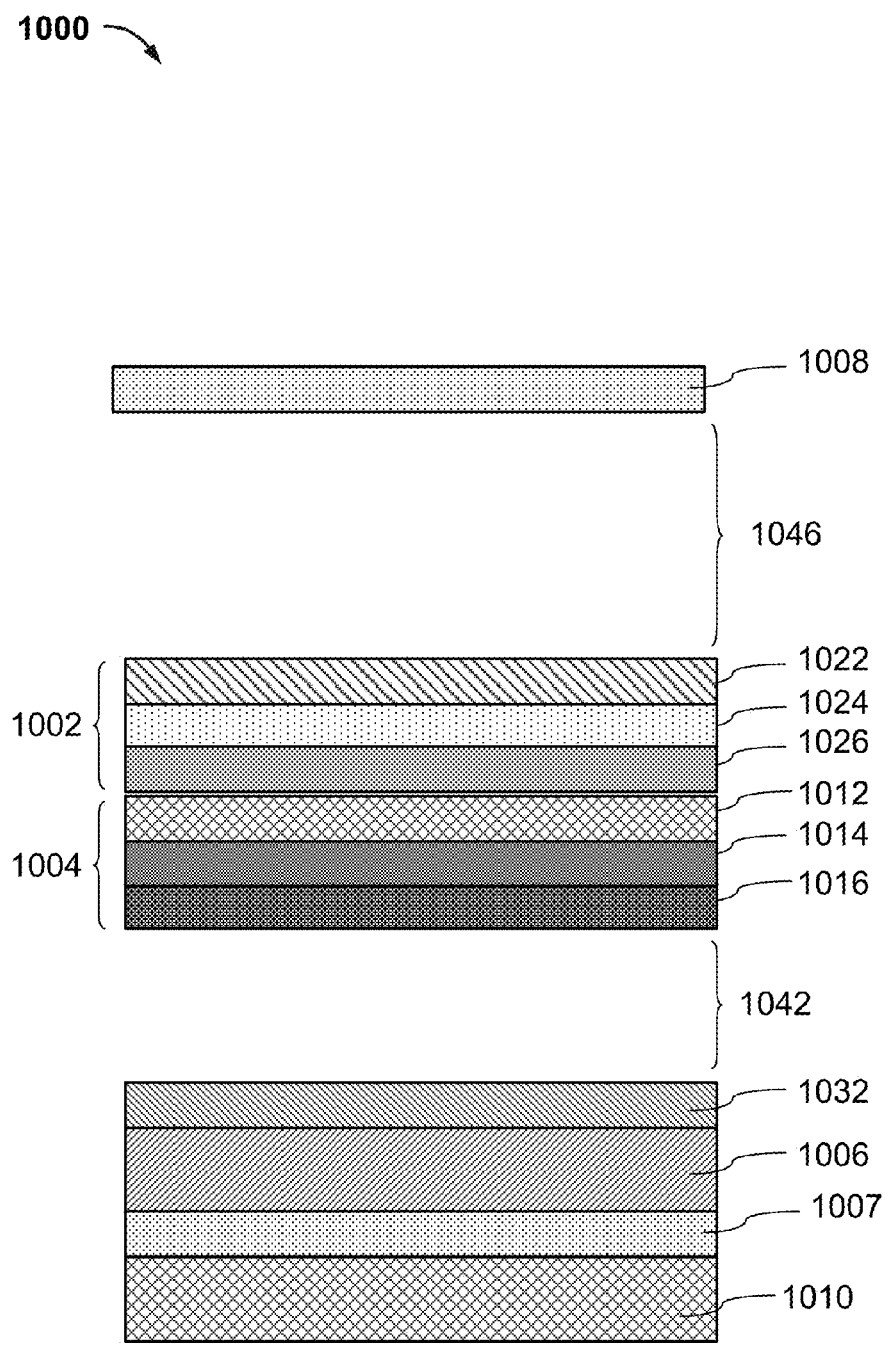
Figure 10B:
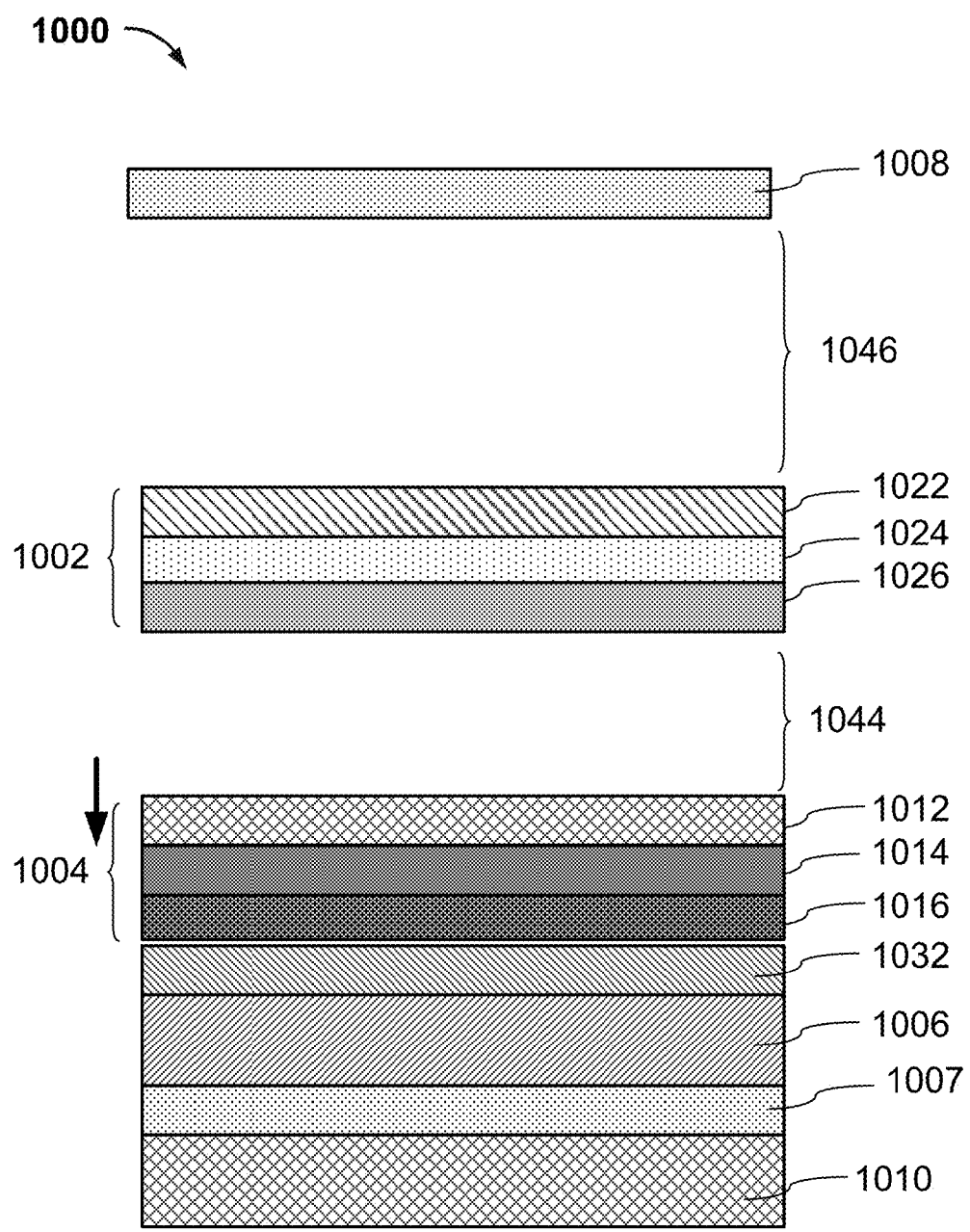
Figure 10C:
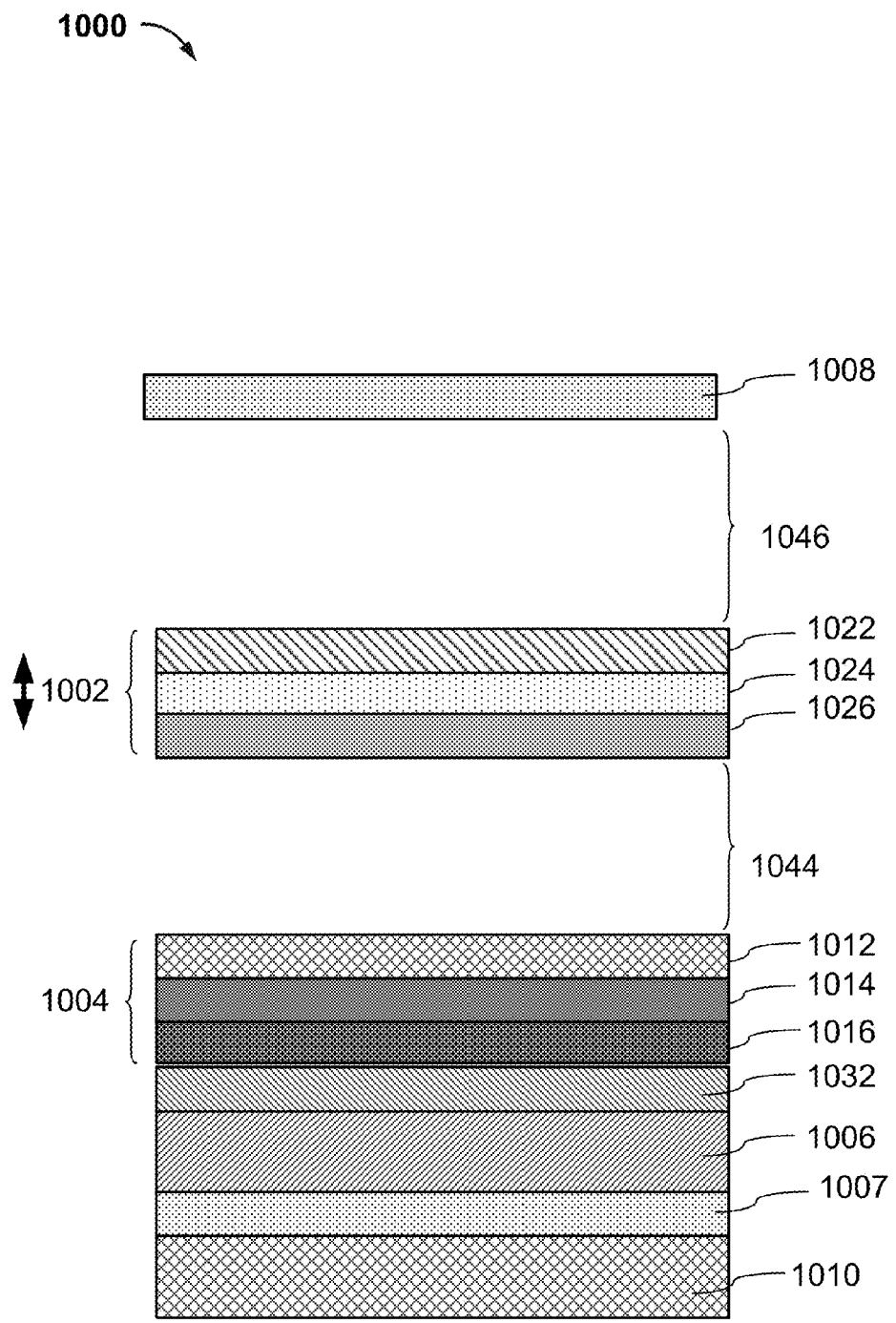

Turning now to FIGS. 10A-10C, FIGS. 10A-10C show examples of cross-sectional schematic diagrams of a portion of an analog or multistate EMS display device 1000. The EMS display device 1000 includes a reflector assembly 1002 and an absorber assembly 1004. In this example, the EMS display device 1000 further includes a base dielectric layer 1006, a base electrode layer 1007 and a top electrode layer 1008. The base dielectric layer 1006 and the dielectric layer on which the top electrode layer 1008 is disposed may include $SiO_2$, for example. The base dielectric layer 1006 and the base electrode layer 1007 may be disposed on a substrate 1010.

As shown in FIGS. 10A-10C, the absorber assembly 1004 is positioned between the base dielectric layer 1006 and the reflector assembly 1002. The reflector assembly 1002 is positioned between the absorber assembly 1004 and the top electrode layer 1008.

The substrate 1010 may be a transparent substrate such as glass (for example, a display glass or a borosilicate glass) or plastic, and it may be flexible or relatively stiff and unbending. In some implementations, a glass substrate 1010 may be about 400 microns to 1000 microns thick or about 700 microns thick. The reflector assembly 1002, the absorber assembly 1004, and the top electrode layer 1008 may be mechanically connected, directly or indirectly, to the substrate 1010 around the perimeters of the reflector assembly 1002, the absorber assembly 1004, and the top electrode layer 1008 by support posts (not shown).

The reflector assembly 1002 of the analog or multistate EMS display device 1000, as shown in FIGS. 10A-10C, includes three layers, 1022, 1024, and 1026, of different materials. In some implementations, a reflective metal layer 1022 may be greater than about 10 nm thick. For example, the reflective metal layer 1022 may be about 40 nm, 50 nm, or 60 nm thick. In some implementations, the reflective metal layer 1022 may be may be Al. A first dielectric layer 1024 may be disposed on the surface of the reflective metal layer 1022, and a second dielectric layer 1026 may be disposed on the surface of the first dielectric layer 1024. Each of the dielectric layers 1024 and 1026 has a refractive index. The refractive index of a material is a measure of the speed of light in the material. In some implementations, the material of the first dielectric layer 1024 may have a refractive index that is lower than the refractive index of the material of the second dielectric layer 1026. Examples of materials that may be used for the first dielectric layer 1024 include $SiO_2$, SiON, magnesium fluoride ($MgF_2$), aluminum oxide ($Al_2O_3$), hafnium fluoride ($HfF_4$), ytterbium fluoride ($YbF_3$), cryolite (sodium hexafluoroaluminate, $Na_3AlF_6$), and other dielectric materials. Examples of materials that may be used for the second dielectric layer 1026 include titanium oxide ($TiO_2$), silicon nitride ($Si_3N_4$), zirconium dioxide ($ZrO_2$), tantalum oxide ($Ta_2O_5$), antimony oxide ($Sb_2O_3$), hafnium oxide ($HfO_2$), scandium oxide ($Sc_2O_3$), indium oxide ($In_2O_3$), indium-tin oxide (ITO, $Sn:In_2O_3$), and other dielectric materials.

The absorber assembly 1004 of the analog or multistate EMS display device 1000, as shown in FIGS. 10A-10C, includes three layers, 1012, 1014, and 1016, of different materials. A metal layer 1014 may be a partially absorptive and partially reflective metal, such as Cr, tungsten (W), nickel (Ni), vanadium (V), titanium (Ti), rhodium (Rh), platinum (Pt), germanium (Ge), cobalt (Co), or MoCr of a semi-transparent thickness. In some implementations, the metal layer 1014 may be less than about 10 nm thick. For example, the metal layer may be about 5 nm to 8 nm thick. In some implementations, the metal layer 1014 may be about an order of magnitude thinner than the reflective metal layer 1022 of the reflector assembly 1002.

A passivation layer 1012 may be disposed on a surface of the metal layer 1014 facing the reflector assembly 1002. In some implementations, the passivation layer may include $Al_2O_3$ or another dielectric material. In some implementations, the passivation layer 1012 may be about 5 nm to 15 nm thick or about 10 nm thick. In some implementations, the passivation layer 1012 may protect the metal layer 1014 from an etchant in the manufacturing process for the EMS display device 1000. In some implementations, the passivation layer 1012 may aid in preventing stiction in the EMS display device 1000 between the metal layer 1014 and the second dielectric layer 1026.

A third dielectric layer 1016 may be disposed on the surface of the metal layer 1014 facing the base dielectric layer 1006. A fourth dielectric layer 1032 may be disposed on a surface of the base dielectric layer 1006 facing the absorber assembly 1004. In some implementations the combination of 1024 and 1026 provides the proper spacing between the metal reflector 1022 and the metal absorber 1014 as well as the proper dispersion property to achieve an optimum white when the absorber assembly 1004 is in an absorber white state position proximate the reflector assembly 1002 and the reflector assembly 1002 is in a reflector white/black position. Each of the dielectric layers 1016 and 1032 has a refractive index. In some implementations, the material of the third dielectric layer 1016 may have a refractive index that is lower than the refractive index of the material of the fourth dielectric layer 1032. Examples of materials that may be used for the third dielectric layer 1016 include $SiO_2$, SiON, $MgF_2$, $Al_2O_3$, and other dielectric materials. Examples of materials that may be used for the fourth dielectric layer 1032 include $TiO_2$, $Si_3N_4$, $ZrO_2$, $Ta_2O_5$, $Sb_2O_3$, and other dielectric materials.

FIG. 10A shows the analog or multistate EMS display device 1000 in a white state. In the white state, the EMS display device 1000 is configured to reflect light across substantially the entire visible spectrum (i.e., the reflected color appears white). In the white state, the absorber assembly 1004 and the fourth dielectric layer 1032 define a first gap 1042 between the absorber assembly 1004 and the substrate 1010. In some implementations, the first gap 1042 may have a height of about 90 nm to 140 nm. In the white state, the reflector assembly 1002 and the top electrode layer 1008 define a third gap 1046. In the white state, the absorber assembly 1004 is in an absorber white state position proximate the reflector assembly 1002, and the reflector assembly 1002 is in a reflector white/black position. The dielectric layers 1024 and 1026 may contribute to affecting the location of a node of a standing wave reflecting off of the metal reflector 1022 so that, when the reflector assembly 1002 is in close proximity to the absorber assembly 1004, a large range of wavelengths have little or no field intensity at the metal layer 1014 thereby substantially minimizing light absorption by the metal layer 1014 when the EMS display device 1000 is in the white state. In some implementations, one or more dielectric layers may be disposed on or under the dielectric layers 1024 and 1026 to further reduce light absorption.

In some implementations, in the white state, the absorber assembly 1004 may be in contact with the reflector assembly 1002, and in some other implementations, the absorber assembly 1004 may be in a position close to the reflector assembly 1002. When the absorber assembly 1004 is in a position close to the reflector assembly 1002, there may be a substantially uniform gap of about 5 nm to 15 nm or about 10 nm between the absorber assembly 1004 and the reflector assembly 1002. For example, in some implementations, either the absorber assembly 1004 or the reflector assembly 1002 may include small protrusions protruding about 5 nm to 15 nm or about 10 nm from its surface. These small protrusions may aid in forming a substantially uniform gap between the absorber assembly 1004 and the reflector assembly 1002; for example, the protrusions may set the dimensions of the gap.

FIG. 10B shows the analog or multistate EMS display device 1000 in a black state. In the black state, the EMS display device 1000 is configured to absorb light or to substantially not reflect light. In the black state, the absorber assembly 1004 and the reflector assembly 1002 define a second gap 1044. In some implementations, the second gap 1044 may be about 90 nm to 140 nm high. In the black state, the reflector assembly 1002 and the top electrode layer 1008 define a third gap 1046. In the black state, the absorber assembly 1004 is in a closed position closer to the substrate (proximate the base dielectric layer 1006 in this example), and the reflector assembly 1002 is in a reflector white/black position. The dielectric layers 1016 and 1032 may aid to substantially minimize reflection from the EMS display device 1000 when the device is in the black state. In some implementations, one or more dielectric layers may be disposed on or under the dielectric layers 1016 and 1032 to further reduce reflection.

In some implementations, in the black state, the absorber assembly 1004 may be in contact with the fourth dielectric layer 1032, and in some other implementations, the absorber assembly 1004 may be in a position close to the fourth dielectric layer 1032. When the absorber assembly 1004 is in a position close to the fourth dielectric layer 1032, there may be a substantially uniform gap of about 5 nm to 15 nm or about 10 nm between the absorber assembly 1004 and the fourth dielectric layer 1032. For example, in some implementations, either the absorber assembly 1004 or the fourth dielectric layer 1032 may include small protrusions protruding about 5 nm to 15 nm or about 10 nm from its surface. These small protrusions may aid in forming a substantially uniform gap between the absorber assembly 1004 and fourth dielectric layer 1032; for example, the protrusions may set the dimensions of the gap.

FIG. 10C shows the analog or multistate EMS display device 1000 in a colored state; i.e., a user would see a color through the base dielectric layer 1006. In the colored state, the EMS display device 1000 is configured to reflect light of a specific wavelength or a specific band of wavelengths. In the colored state, the absorber assembly 1004 and the reflector assembly 1002 define a second gap 1044. In the colored state, the reflector assembly 1002 and the top electrode layer 1008 define a third gap 1046. In the colored state, the absorber assembly 1004 is in the second position proximate the base dielectric layer 1006, similar to the black state. In the colored state, however, the reflector assembly 1002 moves from the reflector white/black position to a reflector color position, increasing the height of the second gap 1044 and decreasing the height of the third gap 1046. For example, in some implementations, the second gap may be about 90 nm to 650 nm in height, depending on the desired color of reflection. In some implementations, movement of the reflector assembly 1002 may increase the height of the second gap 1044 from about 90 nm to 140 nm to about 560 nm to 720 nm, and heights therebetween. For example, in some implementations, in the colored state, the second gap may have a height of about 140 nm to 650 nm. In some other implementations, movement of the reflector assembly may decrease the height of the third gap to substantially zero; i.e., the movement of the reflector assembly 1002 may collapse the third gap.

The color produced by the analog or multistate EMS display device 1000 in the colored state may depend on the position of the reflector assembly 1002 and the heights of the second gap 1044. For example, in some implementations, the reflector assembly 1002 may be moved to a continuum of positions to produce a broad array or colors. In some implementations, the reflector assembly 1002 may be moved from the reflector white/black position to about 3 or more, 6 or more, 14 or more, 30 or more, or 62 or more different reflector color positions, producing about 3, 8, 16, 32, or 64 different colors, including black and white.

The thickness of each of the dielectric layers 1024, 1026, 1016, and 1032 may be specified such that the EMS display device 1000 reflects substantially a maximum amount of light across the entire visible spectrum (i.e., a white light) when the analog or multistate EMS display device 1000 is in the white state and reflects substantially a minimum amount of light across the entire visible spectrum (i.e., a black) when the EMS display device 1000 is in the black state. For example, the dielectric layers 1024 and 1026 may aid in reflecting a white light when the EMS display device 1000 is in the white state. The thicknesses of the dielectric layers 1024 and 1026 may be specified such that the spatial dispersion of first nulls of standing waves produced in the EMS display device 1000 are modified such that a minimal amount of visible light absorption (or a large amount of visible light reflection) is achieved when the absorber assembly 1004 is at the absorber white state position and the reflector assembly 1002 is in the reflector white/black position (that is, in the white state). The dielectric layers 1016 and 1032 may aid in generating a black when the EMS display device 1000 is in the black state. The thickness of the first dielectric layer 1024 may be about 50 nm to 80 nm. The thickness of the second dielectric layer 1026 may be about 15 nm to 40 nm. The thickness of the third dielectric layer 1016 may be about 20 nm to 60 nm. The thickness of the fourth dielectric layer 1032 may be about 10 nm to 40 nm. The thickness of each of the dielectric layers 1024, 1026, 1016, and 1032 will depend on the refractive index of the material of the dielectric layer.

For example, in some implementations, an analog or multistate EMS display device 1000 may include a reflector assembly 1002, with the reflector assembly 1002 including a metal layer 1022 of Al, a first dielectric layer 1024 of SiON about 77 nm thick disposed on metal layer 1022, and a second dielectric layer 1026 of $TiO_2$ about 22 nm thick disposed on the first dielectric layer 1024. The EMS display device 1000 also may include an absorber assembly 1004, with the absorber assembly 1004 including a metal layer 1014 of V about 7.5 nm thick, a passivation layer 1012 of $Al_2O_3$ about 9 nm thick disposed on a surface of the metal layer 1014 facing the reflector assembly 1002, and a third dielectric layer 1016 of $SiO_2$ about 22 nm thick disposed on a surface of the metal layer 1014 facing a base dielectric layer 1006. The base dielectric layer 1006 may have a fourth dielectric layer 1032 disposed on a surface of the base dielectric layer 1006 facing the absorber assembly 1004 of $Si_3N_4$ about 27 nm thick. A first gap 1042 defined when the EMS display device 1000 is in the white state may be about 120 nm in height, and a second gap 1044 defined when the EMS display device 1000 is in the black state also may be about 120 nm in height.

In some implementations, the absorber assembly 1004 may be made thicker to increase the mechanical stiffness by including a thicker third dielectric layer 1016 of $SiO_2$ disposed on a surface of the metal layer 1014 facing the base dielectric layer 1006. For example, in some implementations, the third dielectric layer 1016 of $SiO_2$ may be about 40 nm thick, about 50 nm thick, or about 60 nm thick. In some implementations, although a thicker layer of $SiO_2$ may deviate from the optimum thickness, it may not significantly impact the performance of the EMS display device, as discussed below with respect to FIG. 13.

As noted above, the thicknesses of each or the dielectric layers 1024, 1026, 1016, and 1032 may depend on the refractive index of the material of each of the dielectric layers 1024, 1026, 1016, and 1032. For example, for the EMS display device 1000 described above including the third dielectric layer of $SiO_2$ about 22 nm thick, the $SiO_2$ of the third dielectric layer could be substituted with a layer of $MgF_2$ about 50 nm thick. The substitution of $SiO_2$ with $MgF_2$ may reduce the height of the first gap 1042 and the second gap 1044 to about 90 nm and increase the thickness of the absorber assembly 1004. In some implementations, substituting the third dielectric layer of $SiO_2$ with a layer of $MgF_2$ may not significantly impact the performance of the EMS display device, as discussed below with respect to FIG. 14.

The analog or multistate EMS display devices 900 shown in FIGS. 9A-9C and 1000 shown in FIGS. 10A-10C may include electrodes to actuate the reflector assembly and the absorber assembly. For example, in the examples shown in FIGS. 10A-10C, the EMS display device 1000 includes a base electrode layer 1007 disposed between the base dielectric layer 1006 and the substrate 1010. In alternative implementations, the EMS display device 1000 may include a base electrode layer 1007 disposed between the base dielectric layer 1006 and the fourth dielectric layer 1032. The base electrode 1007 may be a transparent electrode, such as an electrode including a transparent conductive oxide. Indium-tin oxide (ITO) is one example of a transparent conductive oxide.

In some implementations, the base electrode layer 1007 and the top electrode layer 1008 of the EMS display device 1000 may include a transparent conductive oxide, such as indium-tin oxide, for example, or a metal, such as Al, AlCu, or Cu, for example.

In operation, both the reflective metal layer 1022 of the reflector assembly 1002 and the metal layer 1014 of the absorber assembly 1004 may be grounded. The absorber assembly 1004 may have two positions, an absorber white state position and a closed position. In some implementations, the position of the absorber assembly 1004 may be controlled by a voltage applied to the base electrode layer 1007. In some implementations, the position of the reflector assembly 1002 may be controlled by a voltage applied to the top electrode layer 1008.

For example, the reflector assembly 1002 may be in the reflector white/black position when no voltage is applied to the top electrode layer 1008. That is, the reflector assembly 1002 may be in a relaxed state when it is in the reflector white/black position. The absorber assembly 1004 may be in the absorber white state position when no voltage is applied to the base electrode layer 1007. That is, the absorber assembly 1004 may be in a relaxed state when it is in the absorber white state position. Thus, when no voltages are applied to either the base electrode layer 1007 or the top electrode layer 1008, the EMS display device 1000 may be in a white state.

Applying a voltage to the base electrode layer 1007 may move the absorber assembly 1004 to the closed position. In this example, there is no voltage applied to the top electrode layer 1008, thus, the EMS display device 1000 may be in a black state. When a voltage is applied to the base electrode layer 1007 to move the absorber assembly 1004 to the closed position, a voltage also may be applied to the top electrode layer 1008 to move the reflector assembly 1002 from the reflector white/black position to a reflector color position, and the EMS display device may be in a colored state.

In some other implementations, the analog or multistate EMS display device 1000 may be manufactured such that the absorber assembly 1004 is in the closed position when it is in a relaxed state. Thus, the EMS display device 1000 may be in a black state when no voltage differences are applied between either the base electrode layer 1008 and the reflector assembly 1002 or between the top electrode layer 1007 and the absorber assembly 1004.

The drive circuitry for an analog or multistate EMS display device including a movable absorber assembly may include additional thin film transistor (TFT) switches compared to an EMS display device that does not include a movable absorber assembly. The additional TFT switches may be used to control the position of the absorber assembly in an EMS display device having a movable absorber assembly, for example.

Figure 11:
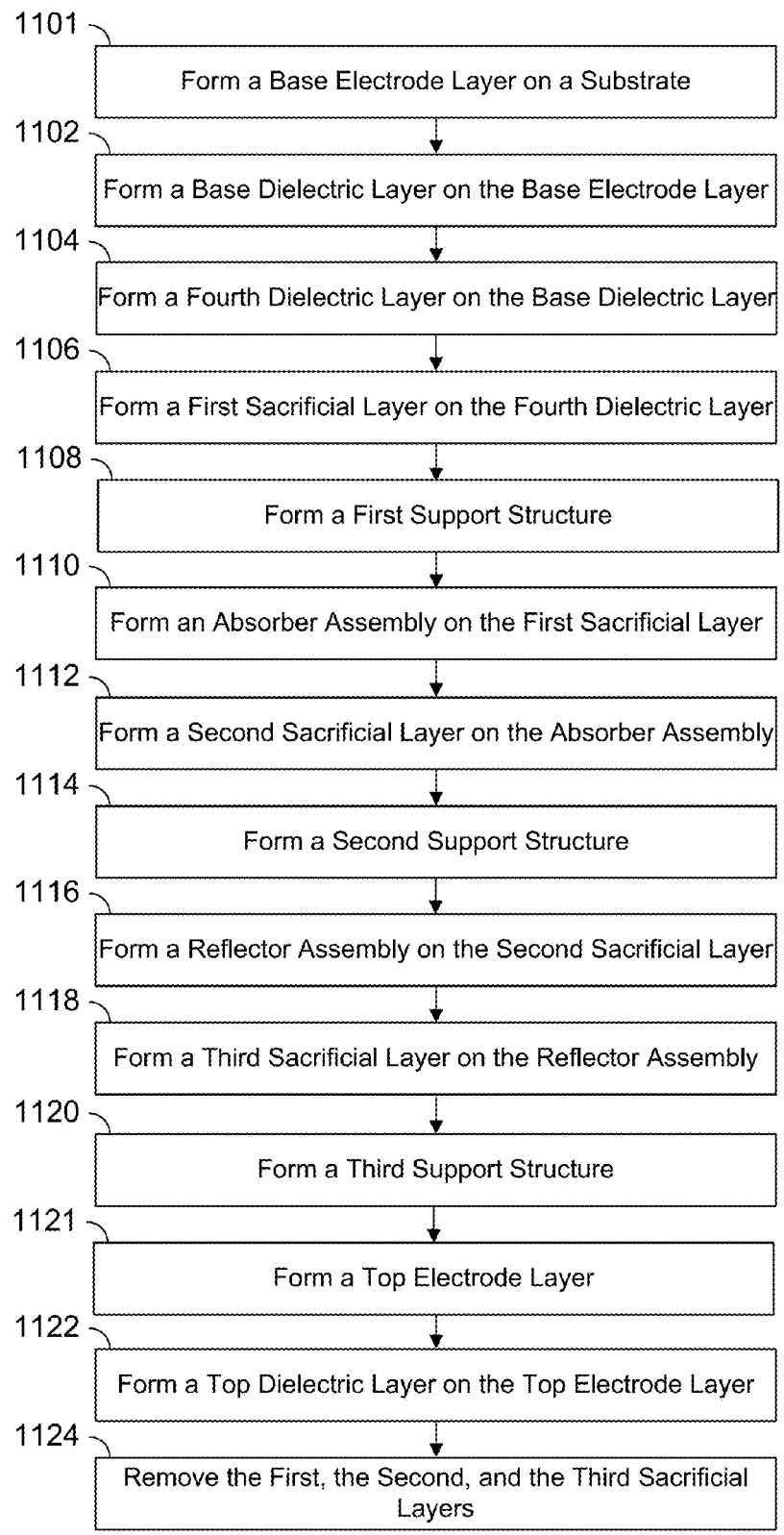
FIG. 11 shows an example of a flow diagram illustrating a manufacturing process for an analog or multistate EMS display device.

FIG. 11 shows an example of a flow diagram illustrating a manufacturing process for an analog or multistate EMS display device. In some implementations, a process 1100 shown in FIG. 11 may be similar to operations in the process 80 shown in FIG. 7 for fabricating a binary IMOD. The process 1100 may be used to fabricate an EMS display device having a movable absorber assembly similar to the EMS display device 1000 shown in FIGS. 10A-10C. Further, the process 1100 may be modified to fabricate other EMS display devices.

The process 1100 may include the formation of the different layers of material included in an analog or multistate EMS display device. Each of these layers of material may be formed using an appropriate deposition process, including PVD processes, CVD processes, atomic layer deposition (ALD) processes, and liquid phase deposition processes. Further, in the process 1100, patterning techniques, including masking as well as etching processes, may be used to define the shapes of the different components of an EMS display device during the manufacturing process.

Starting at block 1101 of the process 1100, a base electrode layer is formed on a substrate. The base electrode layer may be formed of indium tin oxide (ITO) and/or another transparent conductive material. Block 1101 may involve depositing the base electrode layer and patterning the base electrode layer into desired electrode shapes. In block 1102, a base dielectric layer is formed on the base electrode layer. The base dielectric layer may include $SiO_2$ or another dielectric material. At block 1104, a fourth dielectric layer is formed on the base dielectric layer. The fourth dielectric layer may include $TiO_2$, $Si_3N_4$, $ZrO_2$, $Ta_2O_5$, $Sb_2O_3$, and other dielectric materials. At block 1106, a first sacrificial layer is formed on the fourth dielectric layer. The first sacrificial layer may include a $XeF_2$-etchable material such as Mo or amorphous Si in a thickness and size selected to provide, after subsequent removal, a gap having a desired height and size. The first sacrificial layer may be formed using deposition processes including PVD processes and CVD processes.

At block 1108, a first support structure to support an absorber assembly is formed. The first support structure may include $SiO_2$, SiON, and other dielectric materials. The first support structure may include, for example, posts. The formation of posts may include patterning the first sacrificial layer to form a support structure aperture and then depositing the material of the first support structure into the aperture to form the posts.

At block 1110, an absorber assembly is formed on the first sacrificial layer. In some implementations, forming the absorber assembly may include forming a third dielectric layer on the first sacrificial layer, forming a metal layer on the third dielectric layer, and forming a passivation layer on the metal layer. In some implementations, the third dielectric layer may include $SiO_2$, SiON, $MgF_2$, $Al_2O_3$, and other dielectric materials. In some implementations, the metal layer may include Cr, W, Ni, V, Ti, Rh, Pt, Ge, Co, or MoCr. In some implementations, the passivation layer may include $Al_2O_3$ or another dielectric material.

At block 1112, a second sacrificial layer is formed on the absorber assembly. The second sacrificial layer may include a $XeF_2$-etchable material such as Mo or amorphous Si in a thickness and size selected to provide, after subsequent removal, a gap having a desired height and size. In some implementations, the second sacrificial layer may have the same thickness as the first sacrificial layer, and in some other implementations, the thicknesses of the first and the second sacrificial layers may be different. The second sacrificial layer may be formed using deposition processes including PVD processes and CVD processes.

At block 1114, a second support structure to support a reflector assembly is formed. The second support structure may include $SiO_2$, SiON, and other dielectric materials. The second support structure may include, for example, posts. The formation of posts may include patterning the second sacrificial layer to form a support structure aperture and then depositing the material of the second support structure into the aperture to form the posts.

At block 1116, a reflector assembly is formed on the second sacrificial layer. In some implementations, forming the reflector assembly may include forming a second dielectric layer on the second sacrificial layer, forming a first dielectric layer on the second dielectric layer, and forming a reflective metal layer on the first dielectric layer. In some implementations, the second dielectric layer may include $TiO_2$, $Si_3N_4$, $ZrO_2$, $Ta_2O_5$, $Sb_2O_3$, $HfO_2$, $Sc_2O_3$, $In_2O_3$, $Sn:In_2O_3$, and other dielectric materials. In some implementations, the first dielectric layer may include $SiO_2$, SiON, $MgF_2$, $Al_2O_3$, $HfF_4$, $YbF_3$, $Na_3AlF_6$, and other dielectric materials. In some implementations, the reflective metal layer may be Al. In some implementation, a thick dielectric layer with a thickness of about 500 nm to about 2 um is formed on top of the reflector assembly to provide mechanical stiffness. The stiff layer materials may include SiON, $SiO_2$, and other dielectric materials. In some implementation, a symmetrical layer structure of metal/first dielectric layer/second dielectric layer is formed on the top of the thick stiff layer to provide a balanced thermal expansion performance.

At block 1118, a third sacrificial layer is formed on the reflector assembly. The third sacrificial layer may include a $XeF_2$-etchable material such as Mo or amorphous Si in a thickness and size selected to provide, after subsequent removal, a gap having a desired height and size. In some implementations, the third sacrificial layer may have the greater thickness than either the first sacrificial layer or the second sacrificial layer. The third sacrificial layer may be formed using deposition processes including PVD processes and CVD processes.

At block 1120, a third support structure to support a top dielectric layer is formed. The third support structure may include $SiO_2$, SiON, and other dielectric materials. The third support structure may include, for example, posts. The formation of posts may include patterning the third sacrificial layer to form a support structure aperture and then depositing the material of the third support structure into the aperture to form the posts. In block 1121, a top electrode layer is formed. The top electrode layer may be formed on the third support structure and on the third sacrificial layer. The top electrode layer may be formed of a conductive metal such as aluminum and/or another conductive material. Block 1121 may involve depositing the top electrode layer and patterning the top electrode layer into desired electrode shapes. At block 1122, a top dielectric layer is formed on the top electrode layer. The top dielectric layer may include $SiO_2$ or another dielectric material.

At block 1124, the first, the second, and the third sacrificial layers are removed. When the first, second, and third sacrificial layers are Mo or amorphous Si, $XeF_2$ may be used to remove the sacrificial layers by exposing the sacrificial layers to $XeF_2$.

Figure 12:
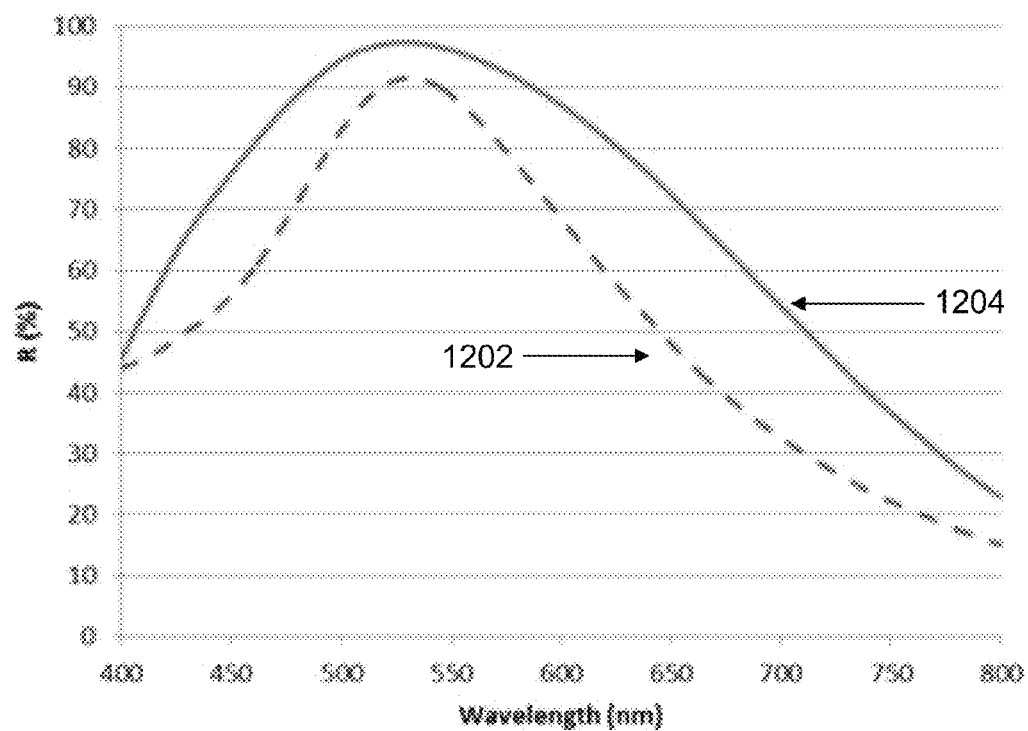
FIGS. 12-14 show examples of reflectance spectrums of the analog or multistate EMS display devices.
Figure 13:
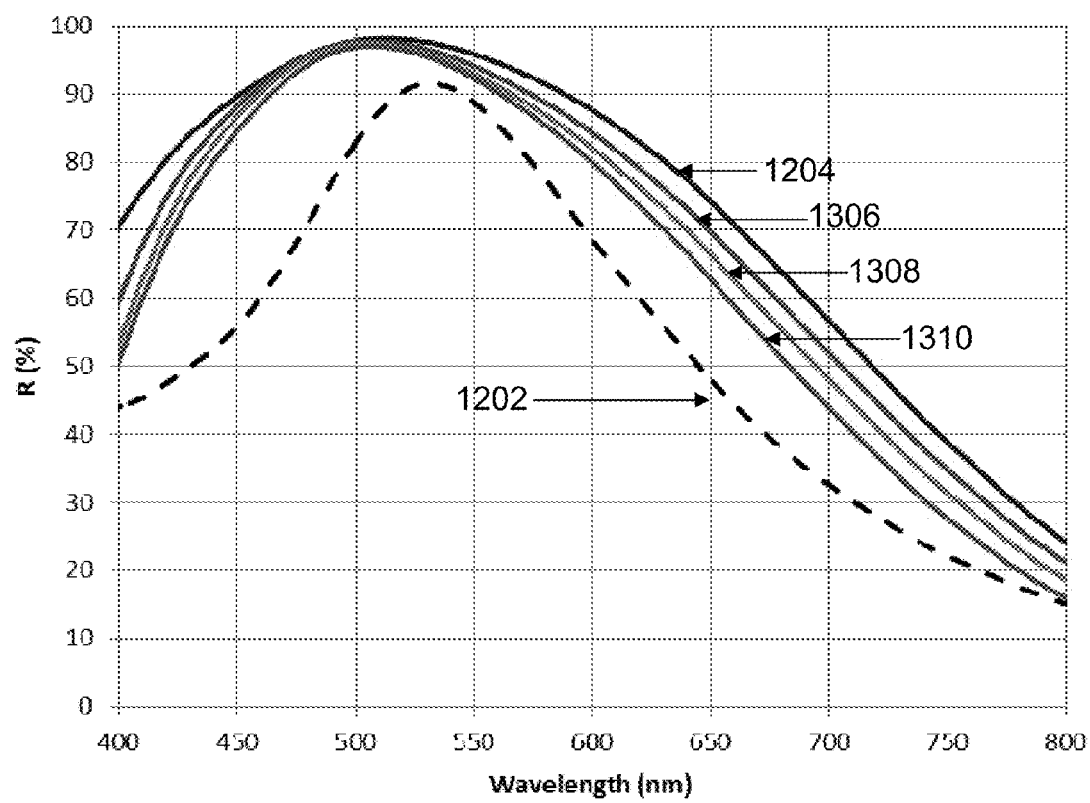
Figure 14:
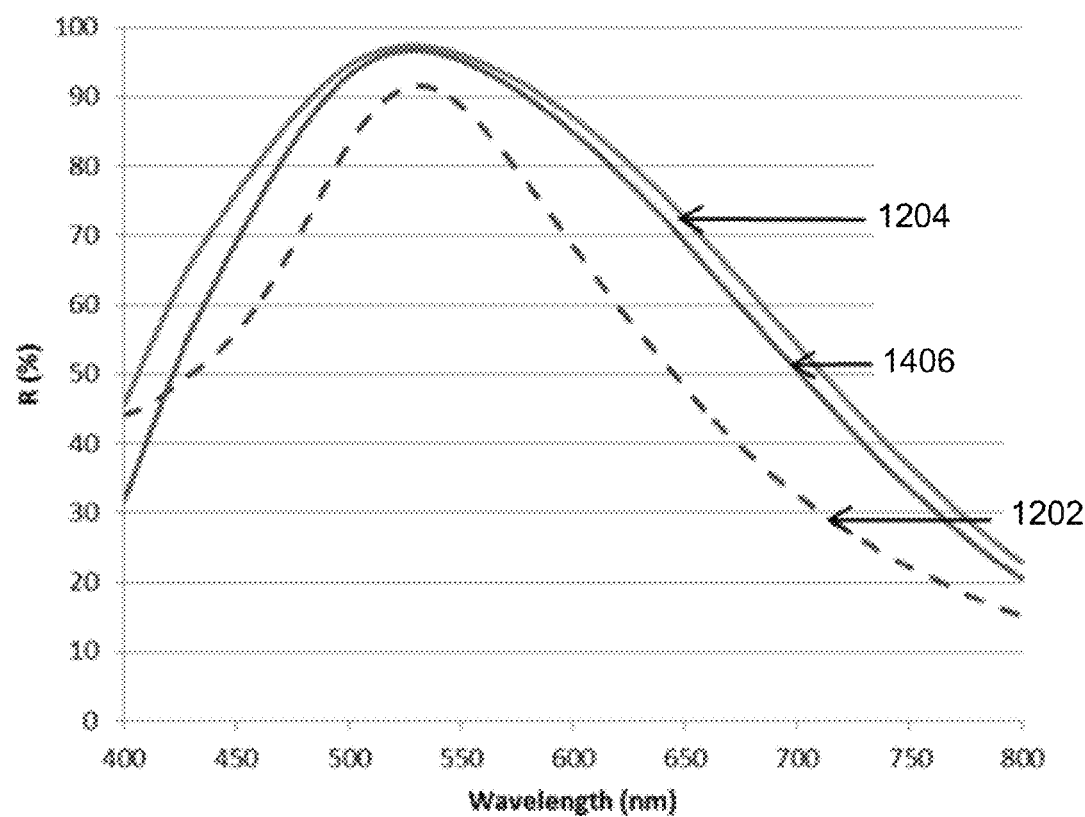

FIGS. 12-14 show examples of reflectance spectrums of the analog or multistate EMS display devices. The EMS display devices generally included a movable reflector assembly including a reflective metal layer of Al, a first dielectric layer of SiON about 77 nm thick disposed on the reflective metal layer, and a second dielectric layer of $TiO_2$ about 22 nm thick disposed on the first dielectric layer. The EMS display devices further included a movable absorber assembly including a metal layer of V about 7.5 nm thick, a passivation layer of $Al_2O_3$ about 9 nm thick disposed on a surface of the metal layer facing the reflector assembly, and a third dielectric layer of $SiO_2$ about 22 nm thick disposed on a surface of the metal layer facing a base dielectric layer. The base dielectric layer of the EMS display devices had a fourth dielectric layer, disposed on the surface of the base dielectric layer facing the absorber assembly, of $Si_3N_4$ about 27 nm thick. A first gap defined when the EMS display devices were in the white state was about 120 nm in height, and a second gap defined when the EMS display devices were in the black state also was about 120 nm in height. The EMS display devices also included a third gap into which the movable reflector assembly could move. Other metal layers, dielectric layers, and cavities of appropriate thicknesses in an EMS display device may be used to obtain similar results. Note that the results shown in FIGS. 12-14 are simulated results, and are not results produced by physical EMS display devices.

FIG. 12 shows an example of reflectance spectrums produced by two different analog EMS display devices in a white state. Plot 1202 is the reflectance spectrum produced by an EMS display device that has a fixed absorber assembly and there is no first gap in this example; this EMS display device, however, did include the same materials having the same thickness as an EMS display device with a movable absorber assembly, as described above. Plot 1204 was produced by an EMS display device including a movable absorber assembly, as described above. The plot 1204 has a greater magnitude and is less pointed than the plot 1202 across the visible spectrum of about 390 nm to 750 nm, indicating a brighter, purer white color in the plot 1204. The luminosity of the plots 1202 and 1204 are about 80% and about 92%, respectively. Luminosity, a measurement of brightness with respect to light reflected by a perfect Lambertian surface, describes the average visual sensitivity of a human eye to light of different wavelengths. For the white state of an EMS display device, higher luminosity indicates a brighter white produced by the EMS display device.

Further, the EMS display device including the movable absorber assembly can achieve a white-to-black contrast ratio of about 92 to 1; the contrast ratio is the ratio of the luminosity of the device in a white state to the luminosity of the device in a black state.

FIG. 13 shows an example of reflectance spectrums produced by different EMS display devices in a white state. The plots 1202 and 1204, as described above with respect to FIG. 12, are included in FIG. 13. The plot 1204 is the reflectance spectrum produced with an EMS display device with an absorber assembly including an about 22 nm thick layer of $SiO_2$. Plot 1306 is the reflectance spectrum produced with an EMS display device with an absorber assembly including a 40 nm thick layer of $SiO_2$; the luminosity is about 91%. Plot 1308 is the reflectance spectrum produced with an EMS display device with an absorber assembly including a 50 nm thick layer of $SiO_2$; the luminosity is about 90%. Plot 1310 is the reflectance spectrum produced with an EMS display device with an absorber assembly including a 60 nm thick layer of $SiO_2$; the luminosity is about 88%. The plots shown in FIG. 13 demonstrate that the $SiO_2$ of the absorber assembly can be made thicker without large changes in the EMS display device performance.

FIG. 14 shows an example of reflectance spectrums produced by different EMS display devices in a white state. The plots 1202 and 1204, as described above with respect to FIG. 12, are included in FIG. 14. The plot 1204 is the reflectance spectrum produced with an EMS display device with an absorber assembly including an about 22 nm thick layer of $SiO_2$. Plot 1406 is the reflectance spectrum produced with an EMS display device with an absorber assembly including a 50 nm thick layer of $MgF_2$ substituted for the layer of $SiO_2$; the luminosity is about 90%. Further, the layer of $MgF_2$ being thicker than the layer of $SiO_2$ (50 nm thick versus 22 nm thick, respectively) reduces the height of the second gap to about 90 nm when the EMS display device is in the white state. The plots shown in FIG. 14 demonstrate that the $SiO_2$ of the absorber assembly can be replaced with a different material having a greater thickness without large changes in the EMS display device performance.

Figure 15A:
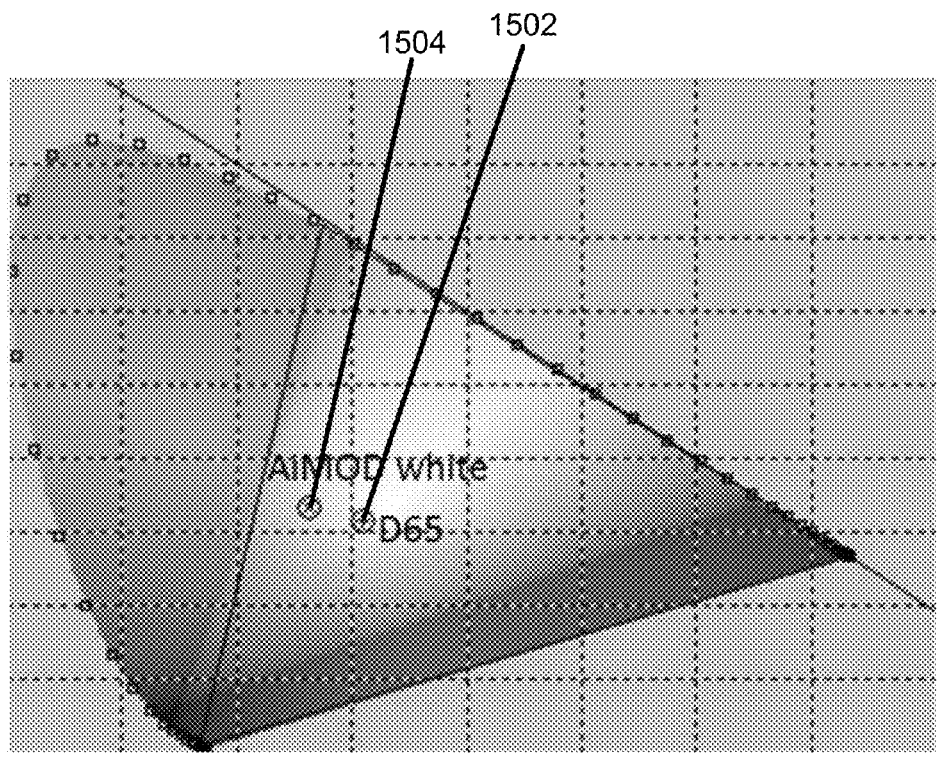
FIGS. 15A and 15B show examples of the white color produced by analog or multistate EMS display devices on CIE 1931 color space chromaticity diagrams.
Figure 15B:
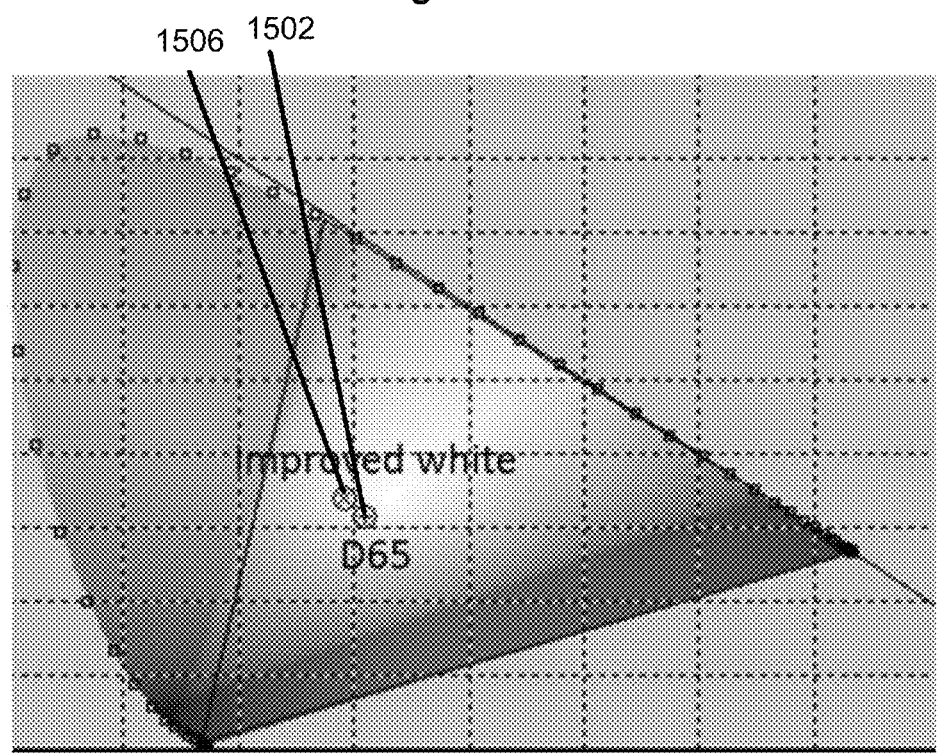

FIGS. 15A and 15B show examples of the white color produced by analog or multistate EMS display devices on CIE 1931 color space chromaticity diagrams. As noted above, the CIE 1931 color space is a mathematically defined color space. Point 1502 indicates the CIE Standard Illuminant D65. Point 1504 indicates the white generated by an EMS display device that has a fixed absorber and does not have a first gap. Point 1506 indicates the white generated by an EMS display device having a movable absorber layer and a first gap. The EMS display devices used to produce points 1504 and 1506 are the same EMS display devices used to produce plots 1202 and 1204, respectively, described above with respect to FIG. 12. The point 1506 is closer to the point 1502 than the point 1504, indicating that the white generated by the EMS display device including the movable absorber assembly is closer to a pure white than the white color produced by the EMS display device having a fixed absorber assembly. Note that the results shown in FIGS. 15A and 15B are simulated results, and are not results produced by physical EMS display devices.

Figure 16A:
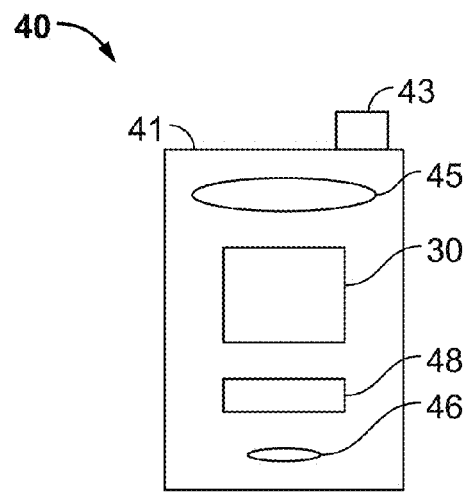
FIGS. 16A and 16B show examples of system block diagrams illustrating a display device that includes a plurality of interferometric modulators.
Figure 16B:
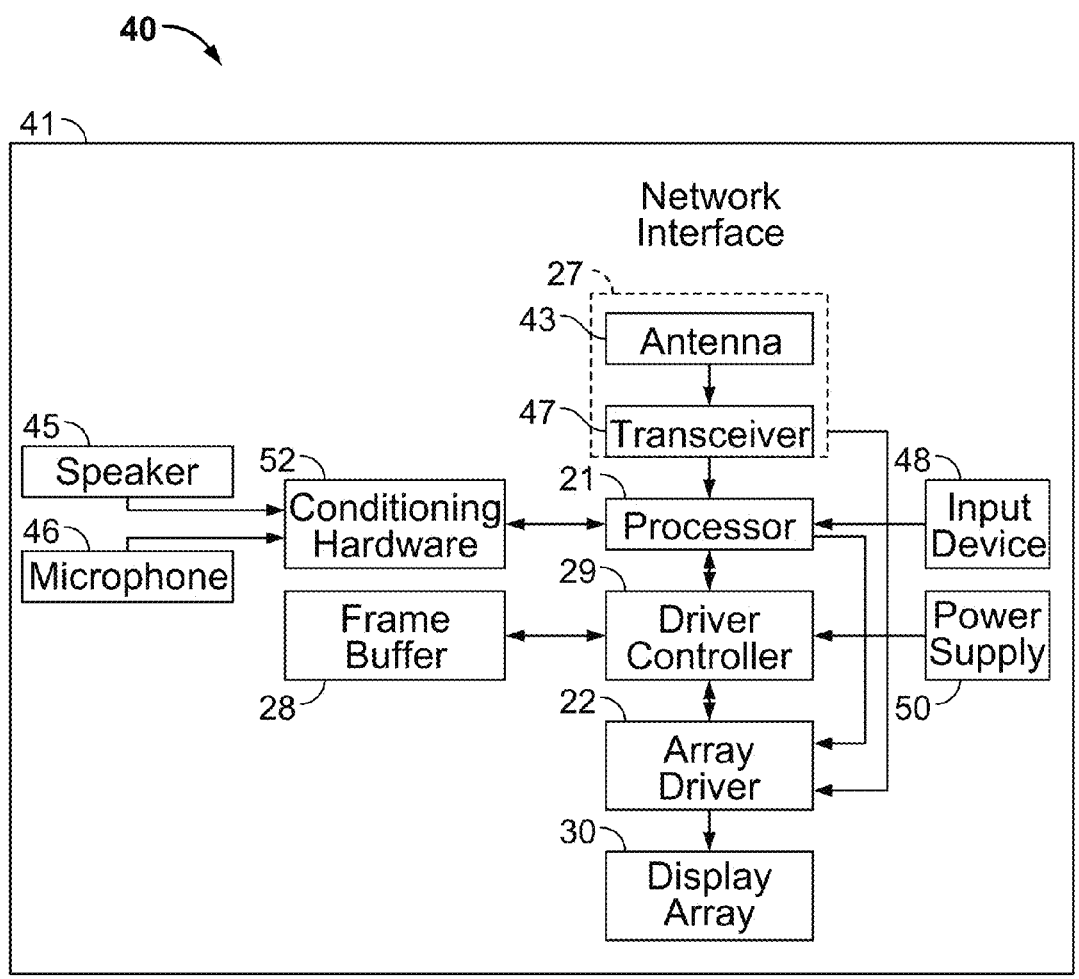

FIGS. 16A and 16B show examples of system block diagrams illustrating a display device 40 that includes a plurality of interferometric modulators. The display device 40 can be, for example, a smart phone, a cellular or mobile telephone. However, the same components of the display device 40 or slight variations thereof are also illustrative of various types of display devices such as televisions, tablets, e-readers, hand-held devices and portable media players.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable, multi-state, or analog IMOD display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 16B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (for example, filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11 a, b, g, n, and further implementations thereof. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

In some implementations, the processor 21 and/or the driver controller 29 may be configured to perform some of the methods described herein. For example, the processor 21 or the driver controller 29 may be configured to position an absorber assembly and a reflector assembly of IMODs in the display 30. The processor 21 or the driver controller 29 may be configured to cause the absorber assembly to move to an absorber white state position proximate the reflector assembly and defining a first gap between the absorber assembly and a substrate when the reflector assembly is in a reflector white/black position. The processor 21 or the driver controller 29 may be configured to cause the absorber assembly to move to a closed position closer to the substrate than the absorber white state position, the closed position defining a second gap between the reflector assembly and the absorber assembly when the reflector assembly is in the reflector white/black position. The processor 21 or the driver controller 29 may be configured to cause the reflector assembly to move from the reflector white/black position to increase a height of the second gap when the absorber assembly is in the closed position.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (such as an IMOD controller). Additionally, the array driver 22 can be a conventional driver or a bi-stable display driver (such as an IMOD display driver). Moreover, the display array 30 can be a conventional display array or a bi-stable display array (such as a display including an array of IMODs). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus. If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blue-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other possibilities or implementations. Additionally, a person having ordinary skill in the art will readily appreciate, the terms "base," "bottom," "top," "upper" and "lower" are sometimes used for ease of describing the figures, and indicate relative positions corresponding to the orientation of the figure on a properly oriented page, and may not reflect the proper orientation of an IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A device comprising:
   a substrate;
   a reflector assembly; and
   an absorber assembly between the reflector assembly and the substrate, the absorber assembly being configured to move to an absorber white state position proximate the reflector assembly and defining a first gap between the absorber assembly and the substrate when the reflector assembly is in a reflector white/black position, the reflector white/black position being a single position of the reflector assembly relative to the substrate in which the device may be in a black state or a white state, according to a position of the absorber assembly relative to the reflector assembly, the absorber assembly further being configured to move to a closed position closer to the substrate than the absorber white state position defining a second gap between the reflector assembly and the absorber assembly when the reflector assembly is in the reflector white/black position, and the reflector assembly being configured to move from the reflector white/black position to increase a height of the second gap when the absorber assembly is in the closed position, wherein when the absorber assembly is in the absorber white state position defining the first gap, the device is in the white state and configured to reflect a white color, and wherein when the reflector assembly is in the reflector white/black position and when the absorber assembly is in the closed position defining the second gap, the device is in the black state and configured to substantially not reflect light.

2. The device of claim 1, further including a base dielectric layer on the substrate, wherein the absorber assembly is proximate the base dielectric layer when the absorber assembly is in the closed position.

3. The device of claim 1, wherein when the reflector assembly is moved from the reflector white/black position to increase the height of the second gap while the absorber assembly is in the closed position, the device is configured to reflect a colored light.

4. The device of claim 1, wherein when the reflector assembly is in the reflector white/black position, the reflector assembly is in a relaxed state.

5. The device of claim 1, wherein the absorber assembly includes a metal layer.

6. The device of claim 5, wherein the absorber assembly further includes a first dielectric layer having a first refractive index on a surface of the metal layer facing a base dielectric layer proximate the substrate, wherein the base dielectric layer includes a second dielectric layer having a second refractive index on a surface of the base dielectric layer facing the absorber assembly, and wherein the first refractive index is smaller than the second refractive index.

7. The device of claim 5, wherein the absorber assembly further includes a passivation layer on a surface of the metal layer facing the reflector assembly.

8. The device of claim 1, wherein the reflector assembly includes:
   a reflective metal layer;
   a first dielectric layer having a first refractive index on a surface of the reflective metal layer facing the absorber assembly; and
   a second dielectric layer having a second refractive index on the first dielectric layer, wherein the first refractive index is smaller than the second refractive index.

9. The device of claim 1, further comprising:
   a top electrode layer on a dielectric layer, the top electrode layer and the reflector assembly defining a third gap, wherein when the reflector assembly moves from the reflector white/black position to increase the height of the second gap, a height of the third gap decreases.

10. The device of claim 1, when the reflector assembly is in the reflector white/black position, the first gap has a height of about 90 nanometers to 140 nanometers and the second gap has a height of about 90 nanometers to 140 nanometers.

11. An apparatus comprising:
   a display, the display including the device of claim 1;

a processor that is configured to communicate with the display, the processor being configured to process image data; and a memory device that is configured to communicate with the processor.

12. The apparatus of claim 11, further comprising:
a top electrode layer on a dielectric layer, the top electrode layer and the reflector assembly defining a third gap;
a base electrode layer formed on the substrate;
a driver circuit configured to control the display by applying a first voltage difference between the top electrode layer and the reflector assembly and by applying a second voltage difference between the base electrode layer and the absorber assembly; and
a controller configured to send at least a portion of the image data to the driver circuit.

13. The apparatus of claim 11, further comprising:
an image source module configured to send the image data to the processor.

14. The apparatus of claim 13, wherein the image source module includes at least one of a receiver, transceiver, and transmitter.

15. The apparatus of claim 11, further comprising:
an input device configured to receive input data and to communicate the input data to the processor.

16. The apparatus of claim 11, further comprising:
a transparent base electrode layer formed on the substrate, wherein a base dielectric layer is formed on the base electrode layer.

17. A device comprising:
a base dielectric layer;
an absorber assembly;
a reflector assembly;
a top electrode layer; and
a base electrode layer;
the absorber assembly between the reflector assembly and the base dielectric layer, the absorber assembly being configured to move to an absorber white state position proximate the reflector assembly defining a first gap when the reflector assembly is in a reflector white/black position, the reflector white/black position being a single position of the reflector assembly relative to the substrate in which the device may be in a black state or a white state, according to a position of the absorber assembly relative to the reflector assembly, the absorber assembly being configured to move to a closed position proximate the reflector assembly defining a second gap when the reflector assembly is in the reflector white/black position; and
the reflector assembly between the absorber assembly and the top electrode layer, the reflector assembly and the top electrode layer defining a third gap when the reflector assembly is in the reflector white/black position, and when the absorber assembly is in the closed position, the reflector assembly being configured to move to a reflector color position between the reflector white/black position and the top electrode layer, wherein when the absorber assembly is in the absorber white state and the reflector assembly is in the reflector white/black position the device is configured to reflect a white color, and wherein when the absorber assembly is in the closed position and the reflector assembly is in the reflector white/black position the device is configured to substantially reflect a black or dark color.

18. The device of claim 17, wherein when the reflector assembly is in the reflector color position and the absorber is in the closed position, the device is configured to reflect a nonwhite, nonblack color.

19. The device of claim 17, wherein when the reflector assembly is in the reflector white/black position, the reflector assembly is in a relaxed state.

20. The device of claim 17, wherein the absorber assembly includes a metal layer.

21. The device of claim 17, wherein the base electrode layer includes an ITO layer.

22. The device of claim 17, wherein the top electrode assembly includes a metal layer.

23. A device comprising:
a substrate;
an absorber assembly;
a reflector assembly;
a top electrode layer; and
a base electrode layer;
the absorber assembly between the reflector assembly and the substrate, the absorber assembly being configured to move to an absorber white state position proximate the reflector assembly defining a first gap having a first height, the absorber assembly being configured to move to a closed position closer to the substrate defining a second gap having a second height between the absorber assembly and the reflector assembly; and
the reflector assembly between the absorber assembly and the top electrode layer, the reflector assembly and the top electrode layer defining a third gap having a third height, and when the absorber assembly is in the closed position, the reflector assembly being configured to move to increase the second height of the second gap and to decrease the third height of the third gap, a reflector white/black position being a single position of the reflector assembly relative to the substrate in which the device may be in a black state or a white state, according to a position of the absorber assembly relative to the reflector assembly, wherein when the absorber assembly is in the absorber white state defining the first gap having the first height, the device is configured to reflect a white color, and wherein when the absorber assembly is in the closed position defining the second gap having the second height while the reflector assembly is in the reflector white/black position, the device is configured to substantially reflect a dark or black color.

24. The device of claim 23, further comprising:
a base dielectric layer on the substrate, wherein the closed position of the absorber assembly is proximate the base dielectric layer.

25. The device of claim 23, wherein the first height is about 80 nanometers to 140 nanometers, and wherein the second height is about 80 nanometers to 140 nanometers.

26. The device of claim 23, wherein when the reflector assembly is moved to increase the second height of the second gap and to decrease the third height of the third gap while the absorber assembly is at the closed position, the device is configured to reflect a colored light.

27. The device of claim 23, wherein the absorber assembly includes a metal layer.

28. The device of claim 23, wherein the base electrode layer includes an ITO layer.

29. The device of claim 23, wherein the top electrode assembly includes a metal layer.

30. The device of claim 5, wherein the metal layer includes vanadium.

31. The device of claim 20, wherein the metal layer includes vanadium.

32. The device of claim 27, wherein the metal layer includes vanadium.

* * * * *